(12) United States Patent
Siomina et al.

(10) Patent No.: US 9,066,262 B2
(45) Date of Patent: Jun. 23, 2015

(54) METHODS AND NODES FOR HANDLING MEASUREMENTS

(75) Inventors: Iana Siomina, Solna (SE); Muhammad Kazmi, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 261 days.

(21) Appl. No.: 13/876,127

(22) PCT Filed: Sep. 30, 2011

(86) PCT No.: PCT/SE2011/051170
§ 371 (c)(1),
(2), (4) Date: Mar. 26, 2013

(87) PCT Pub. No.: WO2012/044246
PCT Pub. Date: Apr. 5, 2012

(65) Prior Publication Data
US 2013/0188510 A1    Jul. 25, 2013

Related U.S. Application Data

(60) Provisional application No. 61/388,391, filed on Sep. 30, 2010.

(51) Int. Cl.
*H04W 24/00* (2009.01)
*H04W 80/04* (2009.01)
*H04W 24/10* (2009.01)
*H04W 64/00* (2009.01)

(52) U.S. Cl.
CPC .............. *H04W 24/10* (2013.01); *H04W 64/00* (2013.01)

(58) Field of Classification Search
USPC .................................................. 370/252, 328
See application file for complete search history.

(56) References Cited

U.S. PATENT DOCUMENTS

| 2010/0056160 | A1* | 3/2010 | Kim et al. ...................... 455/444 |
| 2010/0271953 | A1* | 10/2010 | Kim et al. ...................... 370/241 |
| 2011/0294536 | A1* | 12/2011 | Ryu et al. ...................... 455/525 |

(Continued)

OTHER PUBLICATIONS

3rd Generation Partnership Project. 3GPP TS 36.305 V9.3.0 (Jun. 2010). 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9). Jun. 2010, pp. 1-52.

(Continued)

*Primary Examiner* — Andrew Lee
(74) *Attorney, Agent, or Firm* — Murphy, Bilak & Homiller, PLLC

(57) ABSTRACT

The embodiments herein relate to a method in a positioning node (1005) for handling measurements in a communications network (1000). The positioning node (1005) acquires information about a set of carrier frequencies. The information comprises information about at least a channel number and a bandwidth for each respective carrier frequencies in the set. The positioning node (1005) selects at least one carrier frequency based on the acquired information. The positioning node (1005) sends information about the selected at least one carrier frequency to a network node (101) or a target node (1003). The information further comprises at least a channel number and a bandwidth for the selected carrier frequency, enabling the first node (1001) to perform measurements for a target node (1003) using the selected carrier frequency.

52 Claims, 9 Drawing Sheets

(56) References Cited

U.S. PATENT DOCUMENTS

| | | | |
|---|---|---|---|
| 2011/0312328 A1* | 12/2011 | Choi et al. ..................... | 455/450 |
| 2012/0040687 A1 | 2/2012 | Siomina et al. | |
| 2012/0155316 A1* | 6/2012 | Li et al. ......................... | 370/252 |
| 2012/0263128 A1* | 10/2012 | Hu et al. ........................ | 370/329 |
| 2012/0282922 A1* | 11/2012 | Fodor et al. ................. | 455/426.1 |
| 2013/0053082 A1* | 2/2013 | Chai et al. .................... | 455/509 |
| 2013/0109372 A1* | 5/2013 | Ekici .......................... | 455/422.1 |
| 2014/0098691 A1* | 4/2014 | Kazmi et al. .................. | 370/252 |
| 2014/0198680 A1* | 7/2014 | Siomina et al. ............... | 370/252 |
| 2015/0011236 A1* | 1/2015 | Kazmi et al. ............... | 455/456.1 |

OTHER PUBLICATIONS

3rd Generation Partnership Project. 3GPP TS 36.355 V9.2.1 (Jun. 2010). 3rd Generation Partnership Project; Technical Specification Group Radio Access Network; Evolved Universal Terrestrial Radio Access (E-UTRA); LTE Positioning Protocol (LPP) (Release 9). Jun. 2010, pp. 1-112.

3rd Generation Partnership Project. "Consideration on UE RF capability in CA." 3GPP TSG-RAN WG4 Meeting Ad Hoc 2010 #3, R4-102608, Jun. 28-Jul. 2, 2010, pp. 1-3, Bratislava, Slovakia.

3rd Generation Partnership Project. "Flexible CA/MIMO configuration and related CA/MIMO capabilities information." 3GPP TSG RAN WG4 Meeting Ad hoc 2010#3, R4-102612, Jun. 28-Jul. 2, 2010, pp. 1-4, Bratislava, Slovakia.

3rd Generation Partnership Project. "UE frequency capability for LPP." 3GPP TSG-WG2 Meeting #72, R2-106695, Nov. 15-19, 2010, pp. 1-4, Jacksonville, USA.

3rd Generation Partnership Project. "Autonomous Muting Indication in OTDOA Assistance Information." 3GPP TSG-RAN Meeting #47, RP-100191, Mar. 16-19, 2010, pp. 1-5, Vienna, Austria.

3rd Generation Partnership Project. 3GPP TS 36.211 V9.1.0 (Mar. 2010). 3rd Generation Partnership Project; Technical Specification Group Radio Access Network; Evolved Universal Terrestrial Radio Access (E-UTRA); Physical Channels and Modulation (Release 9). Mar. 2010, pp. 1-85.

3rd Generation Partnership Project. 3GPP TS 36.101 V9.4.0(Jun. 2010). 3rd Generation Partnership Project; Technical Specification Group Radio Access Network; Evolved Universal Terrestrial Radio Access (E-UTRA); User Equipment (UE) radio transmission and reception (Release 9). Jun. 2010, pp. 1-183.

3rd Generation Partnership Project. 3GPP TS 25.215 V9.2.0 (Mar. 2010). 3rd Generation Partnership Project; Technical Specification Group Radio Access Network; Physical layer; Measurements (FDD) (Release 9). Mar. 2010, pp. 1-23.

* cited by examiner

METHODS AND NODES FOR HANDLING MEASUREMENTS

TECHNICAL FIELD

Embodiments herein relate generally to a positioning node and a method in the positioning node, and to a first node and a method in the first node.

More particularly the embodiments herein relate to handling measurements in a communications network.

BACKGROUND

In a typical cellular network, also referred to as a wireless communication system, User Equipments (UEs), communicate with a radio network node, in a Radio Access Network (RAN).

A user equipment is a mobile terminal by which a subscriber may access services offered by an operator's core network and services outside operator's network to which the operator's RAN and CN provide access. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server. User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The radio access network covers a geographical area which is divided into cell areas, with each cell area being served by a Base Station (BS), e.g. a Radio Base Station (RBS), which in some radio access networks is also called evolved NodeB (eNB), NodeB, or radio base station. A cell is a geographical area where radio coverage is provided by the radio base station at a base station site. Each cell is identified by an identity within the local radio area, which is broadcasted in the cell. The base stations communicate over the air interface operating on radio frequencies with the user equipments within coverage range of the base stations.

In some versions of the radio access network, several base stations are typically connected, e.g. by landlines or microwave, to a Radio Network Controller (RNC), as in third Generation (3G), i.e. Wideband Code Division Multiple Access (WCDMA). The radio network controller supervises and coordinates various activities of the plural base stations connected thereto. In second Generation (2G), i.e. Global System for Mobile Communications (GSM), the base stations are connected to a Base Station Controller (BSC). The network controllers are typically connected to one or more core networks.

Some nodes in the communications network may also be equipped with user equipment-like interface, e.g., to be able to receive downlink signals.

The possibility of identifying a user equipments geographical location in a wireless cellular communication network has enabled a large variety of commercial and non-commercial services, e.g., navigation assistance, social networking, location-aware advertising, emergency calls, etc. Different services may have different positioning accuracy requirements imposed by the application. In addition, some regulatory requirements on the positioning accuracy for basic emergency services exist in some countries.

In many environments, the position of a user equipment may be accurately estimated by using positioning methods based on the Global Positioning System (GPS). Nowadays, networks also often may assist user equipments in order to improve the user equipment, or terminal, receiver sensitivity and GPS start-up performance, i.e. Assisted-GPS positioning (A-GPS). GPS receivers or A-GPS receivers, however, may not necessarily be available in all wireless user equipments. Furthermore, GPS is known to fail often in indoor environments and urban canyons. A complementary terrestrial positioning method, called Observed Time Difference of Arrival (OTDOA), has therefore been standardized by the Third Generation Partnership Project (3GPP). In addition to OTDOA, the Long Term Evolution (LTE) cellular standard also specifies methods, procedures, and signaling support for Enhanced Cell ID (E-CID) and Assisted Global Navigation Satellite System (A-GNSS) positioning. Later, Uplink TDOA (UTDOA) may also be standardized for LTE.

With E-CID positioning, the following sources of position information may be involved: the Cell Identification (CID) and corresponding geographical description of a serving cell, the Timing Advance (TA) of the serving cell, and the CIDs and corresponding signal measurements of the cells, e.g. up to 32 cells in LTE, including the serving cell, as well as Angle-of-Arrival (AoA) measurements. The following user equipment measurements may be utilized for E-CID in LTE: Evolved Universal Terrestrial Radio Access (E-UTRA) carrier Received Signal Strength Indicator (RSSI), Reference Signal Received Power (RSRP), Reference Signal Received Quality (RSRQ), and UE receive-transmit (Rx-Tx) time difference. The E-UTRA network (E-UTRAN) measurements available for E-CID include eNodeB Rx-Tx time difference, also called TA Type 2; TA Type 1, being (eNodeB Rx-Tx time difference)+(UE Rx-Tx time difference); and uplink (UL) AoA. UE Rx-Tx measurements are typically used for the serving cell, and for example RSRP and RSRQ as well AoA may be utilized for any cell and may also be conducted on a frequency different from that of the serving cell.

User equipment E-CID measurements are reported by the user equipment to a positioning server, e.g., an Enhanced Serving Mobile Location Centre (E-SMLC) or Secure User Plane Location (SUPL) Platform (SLP) in LTE, over the LTE Positioning Protocol (LPP), and the E-UTRAN E-CID measurements are reported by the eNodeB to the positioning node over the LPP Annex protocol (LPPa). Some measurements, e.g. UE Rx-Tx, may also be reported to the eNodeB for some measurement configurations.

With OTDOA positioning, a user equipment measures the timing differences for DownLink (DL) reference signals received from multiple distinct locations. For each, e.g. measured, neighbor cell, the user equipment measures Reference Signal Time Difference (RSTD) which is the relative timing difference between neighbor cell and the reference cell. The user equipment position estimate is then found as the intersection of hyperbolas corresponding to the measured RSTDs. At least three measurements from geographically dispersed base stations with a good geometry are needed to solve for two coordinates of the user equipment and the receiver clock bias. In order to solve for position, precise knowledge of the transmitter locations and transmit timing offset is needed. Position calculation may be conducted, for example, by a positioning server, e.g., E-SMLC or SLP in LTE, or the user equipment. The former approach corresponds to the UE-assisted positioning mode, whilst the latter corresponds to the UE-based positioning mode.

To enable positioning in LTE and facilitate positioning measurements of a proper quality and for a sufficient number of distinct locations, new physical signals dedicated for positioning, e.g. positioning reference signals, or Position Reference Signal (PRS), have been introduced and low-interference positioning subframes have been specified in, for example, 3GPP Technical Specifications.

PRS are transmitted from one antenna port, e.g. R6, according to a pre-defined pattern. A frequency shift, which is a function of Physical Cell Identity (PCI), may be applied to the specified PRS patterns to generate orthogonal patterns and modeling the effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g., Cell-specific Reference Signals (CRS), may be used for positioning measurements.

PRS are transmitted in pre-defined positioning subframes grouped by several consecutive subframes, e.g. N_PRS, i.e. one positioning occasion. Positioning occasions occur with a periodicity of N subframes, i.e., the time interval between two positioning occasions. The standardized periods N are 160, 320, 640, and 1280 milliseconds (ms), and the number of consecutive subframes is 1, 2, 4, and 6.

Since for OTDOA positioning PRS signals from multiple distinct locations need to be measured, the user equipment receiver may have to deal with PRS that are much weaker than those received from the serving cell. Furthermore, without approximate knowledge of when the measured signals are expected to arrive in time and what is the exact PRS pattern, the user equipment would need to do signal search within a large window which would impact the time and accuracy of the measurements as well as the user equipment complexity. To facilitate user equipment measurements, the network, e.g. a positioning node such as e.g. the E-SMLC or SLP, transmits assistance data to the user equipment. The assistance data comprises, among the other things, reference cell information, a neighbor cell list containing PCIs of neighbor cells, the number of consecutive downlink subframes, PRS transmission bandwidth, frequency, etc.

The may be restrictions on the number of frequencies in the assistance data. A restriction may be that, in LPP, for the neighbor cell list, the cells comprised in the neighbor cell list in the assistance data may be at most on three different frequencies, controlled by maxFreqLayers parameter, currently set to 3, excluding the reference cell frequency. Another restriction may be that, for inter-frequency RSTD requirements, the 3GPP specifies inter-frequency RSTD requirements that apply for two frequencies which are the serving cell frequency and the measured cell frequency.

OTDOA and other positioning methods, such as E-CID, are to be used also for emergency calls. Hence, the response time of these measurements should be as low as possible to meet the emergency call requirements. Therefore, it is important to define how the requirements apply when more than one inter-frequency are present in the cell list of the assistance data and which cells are to be included in the neighbor cell list to account for the maxFreqLayers restriction. Note also that the frequency supported by the user equipment/positioning target may or may not be known in the node creating assistance data e.g., the positioning server E-SMLC or SLP in LTE.

Furthermore, one shall note that the cell, e.g. reference and neighbor, information in the RSTD assistance data is optional and it is not explicitly stated what shall be assumed when the reference cell is missing in the assistance data. The reference cell information is used when defining muting configuration, slotNumberOffset and expectedRSTD, which may be defined differently for intra- and inter-frequency, which is important to know since these parameters may also be used for defining parameters for neighbor cells. This indicates the importance of knowing at least the reference cell and the serving cell frequencies.

For LTE Time Division Duplex (TDD), the same positioning measurement definition, the same methods and the same accuracy requirements shall apply as for Frequency Division Duplex (FDD). For intra-frequency RSTD measurement requirements with the smallest reference signal measurement bandwidths as well as for inter-frequency RSTD measurement requirements, not all uplink-downlink subframe configurations are applicable.

To define whether intra- or inter-frequency or inter-Radio Access Technology (RAT) requirements apply, the serving cell frequency and the serving cell RAT information, shall be taken into account e.g. when configuring assistance data.

Inter-frequency measurements may in principle be considered for any positioning method, even though currently not all measurements are specified by the standard as intra- and inter-frequency measurements.

The current standard specifies the minimum number of inter-frequencies the user equipment shall be capable of measuring on, which defines the minimum mandatory user equipment measurement capability. Furthermore, such capability is currently only specified for each duplex mode separately. For example, 3GPP specifies that the user equipment shall be capable of performing RSRP and RSRQ measurements, which are a part of e.g. E-CID, of at least 4 inter-frequency cells per FDD inter-frequency for up to 3 FDD inter-frequencies. Further, the user equipment physical layer shall be capable of reporting RSRP and RSRQ measurements to higher layers with a predefined measurement period. The user equipment shall also be capable of performing RSRP and RSRQ measurements of at least 4 inter-frequency cells per TDD inter-frequency for up to 3 TDD inter-frequencies. The user equipment physical layer shall also be capable of reporting RSRP and RSRQ measurements to higher layers with a predefined measurement period.

There are requirements on the number of frequencies monitored by the user equipment for E-UTRA. The number of frequencies may be dependent on the UE capability, e.g. 3 FDD E-UTRA inter-frequency carriers or 3 TDD E-UTRA inter-frequency carriers. Similar requirements also exist for other RATs.

The user equipment performs inter-frequency measurements in measurement gaps. The measurements are done for various purposes: mobility, positioning, Self Organizing Network (SON), Minimization of Drive Tests (MDT), etc. Furthermore, the same gap pattern is used for all types of inter-frequency and inter-Radio Access Technology (inter-RAT) measurements. Therefore E-UTRAN must provide a single measurement gap pattern with constant gap duration for concurrent monitoring, i.e., cell detection and measurements, of all frequency layers and RATs. The E-UTRA user equipment supports two configurations comprising of the Maximum Gap Repetition Period (MGRP) of 40 ms and 80 ms; both with the measurement gap length of 6 ms. In practice due to the frequency switching time, fewer than 6 sub-frames but at least 5 full sub-frames are available for measurements within each such measurement gap.

In LTE, measurement gaps are configured by the network to enable measurements on the other LTE frequencies and/or other RATs, e.g. UTRA, GSM, Wideband Code Division Multiple Access 2000 (CDMA2000), etc. The gap configuration is signaled to the user equipment over the RRC protocol as part of the measurement configuration. Only one gap pattern may be configured at a time. The same pattern is used for all types of configured measurements, e.g. inter-frequency neighbor cell measurements, inter-frequency positioning measurements, inter-RAT neighbor cell measurements, inter-RAT positioning measurements, e.g. potentially, etc.

In general, in LTE inter-RAT measurements are typically defined similar to inter-frequency measurements, e.g., they may also require configuring measurement gaps like for inter-frequency measurements, but just with more measurements restrictions and often more relaxed requirements for inter-RAT measurements.

For positioning, assuming that LTE FDD and LTE TDD are treated as different RATs, the current standard defines requirements only for FDD-TDD and TDD-FDD inter-frequency measurements, and the requirements are different in the two cases. There are no other inter-RAT measurements specified within any separate RAT for the purpose of positioning and which are possible to report to the positioning node, e.g., an E-SMLC in LTE.

In order to meet the performance requirements of Internet Protocol Multimedia subsystem Telephony-Advanced (IMT-Advanced) systems, a concept known as Carrier Aggregation (CA) has been proposed to aggregate two or more component carriers for supporting high data rate transmissions over a wide bandwidth, i.e., up to a 100 MegaHertz (MHz) for a single user equipment unit, while preserving backward compatibility with legacy systems. The carrier aggregation is also called, e.g., interchangeably called, "multi-carrier system", "multi-carrier operation", "multi-carrier" transmission and/or reception. The Component Carrier (CC) means an individual carrier in a multi-carrier system. One of the CCs is the primary carrier or anchor carrier and the remaining ones are called secondary or supplementary carriers.

Typically the component carriers in carrier aggregation belong to the same technology. E.g. either all are of WCDMA or LTE systems. However the carrier aggregation between carriers of different technologies is also possible to increase the throughput. Using carrier aggregation between carriers of different technologies is also referred to as "multi-RAT carrier aggregation" or "multi-RAT-multi-carrier system" or simply "inter-RAT carrier aggregation". For example, in such systems one CC may belong to LTE FDD and another one to LTE TDD. Yet another example comprises of CCs belonging to UTRAN FDD and E-UTRAN FDD. Another example is the aggregation of LTE and CDMA2000 carriers. The inter-RAT CA system may even comprise of component carriers belonging to more than two RATs. In such systems one of the RATs may be considered as the main or primary RAT while the remaining ones as the auxiliary RATs.

For the sake of clarity the carrier aggregation within the same technology may be regarded as 'intra-RAT' or simply 'single RAT' carrier aggregation.

The carrier frequencies in a frequency band are enumerated. The enumeration is standardized such that the combination of the frequency band and the carrier frequency may be determined by a unique number called absolute radio frequency number. A carrier frequency is a term used to designate the nominal frequency of a carrier wave. Multiple carriers may be configured within a frequency band.

In a GSM system, UTRAN, and E-UTRAN, the channel numbers are respectively called:
Absolute Radio Frequency Channel Number (ARFCN),
UTRA Absolute Radio Frequency Channel Number (UARFCN), and
E-UTRA Absolute Radio Frequency Channel Number (EARFCN).

In FDD systems separate channel numbers are specified for UL and DL. In TDD there is only one channel number since the same frequency is used in both directions.

The channel numbers, e.g., Evolved Absolute Radio Frequency Channel Numbers (EARFCN), for each band are unique to distinguish between different bands. The channel number for each band may be derived from the expressions and mapping tables defined in the relevant specifications. Based on the signaled channel numbers, e.g., EARFCN in E-UTRAN, and the pre-defined parameters associated with each band the user equipment may determine the actual carrier frequency in MHz and the corresponding frequency band. This is explained by the following example.

The relation between the EARFCN and the carrier frequency, F_DL, in MHz for the downlink is pre-defined by the following equation:

$$F\_DL = F\_DL\_low + 0.1(N\_DL - N\_Offs\text{-}DL) \qquad \text{Equation 1}$$

where F_DL_low and N_Offs-DL are pre-defined values in equation 1 for each band and N_DL is the downlink EARFCN.

Consider E-UTRA band 5, whose EARFNC range, e.g. N_DL, as pre-defined in equation 1 lays between 2400-2649. The pre-defined values of F_DL_low and N_Offs-DL are 869 and 2400 respectively. Assume that the network signals downlink EARFCN to be 2500. Using the above expression the user equipment may determine that the downlink carrier frequency of the channel is 879 MHz.

The LTE specifications enable FDD and TDD operation modes. Additionally, half-duplex operation is also specified, which is substantially FDD operation mode but with transmission and receptions not occurring simultaneously, as in TDD. Half-duplex mode has advantages with some frequency arrangements where the duplex filter may be unreasonable, resulting in high cost and high power consumption. Since the carrier frequency number, i.e. EARFCN, is unique, it is possible to determine the frequency band, which is either FDD or TDD, when the frequency number is known. However, it may be more difficult to find the difference between full-duplex FDD and Half-Duplex FDD (HD-FDD) without explicit information since the same FDD band can be used as full FDD or HD-FDD.

General user equipment radio access capabilities are defined in 3GPP. Some of the user equipment positioning capability information may be transferred from the Mobility Management Entity (MME) to the positioning node over the SLs interface. Other user equipment positioning capability information may be transferred from the user equipment to the positioning node over the LPP protocol.

With the current standard, as explained below, the UE capability information that may be obtained over the SLs and with LPP is very limited, and the general user equipment radio access capabilities may not be transferred to the positioning node at all.

The UE radio access capability parameters currently specified in 3GPP comprise:
ue-Category
Radio Frequency (RF) parameters:
supportedBandListEUTRA—this field defines which E-UTRA radio frequency bands are supported by the user equipment. For each band, support for either only half duplex operation, or full duplex operation is indicated. For TDD, the half-duplex indication is not applicable.

Measurement parameters:
  interFreqNeedForGaps and interRAT-NeedForGaps—these fields define for each supported E-UTRA band whether measurement gaps are required to perform measurements on each other supported E-UTRA radio frequency band and on each supported RAT/band combination.

Inter-RAT parameters:
  These parameters are used, e.g., for indication the supported band lists for UTRA FDD, UTRA TDD, GSM Enhanced Data rates for GSM Evolution (EDGE) Radio Access Network (GERAN).

General parameters:
  accessStratumRelease—this field defines the release of the E-UTRA layer 1, 2, and 3 specifications supported by the user equipment, e.g., Release 8 (Rel-8), Release 9 (Rel-9), etc.
  deviceType—this field defines whether the device does not benefit from NW-based battery consumption optimization.

CSG Proximity Indication parameters: intraFreqProximityIndication, interFreqProximityIndication and utran-ProximityIndication Neighbour cell SI acquisition parameters: intraFreqSI-AcquisitionForHO, interFreqSI-AcquisitionForHO, utran-SI-AcquisitionForHO The parameters are signaled as defined in 3GPP according to which the UE radio access capabilities transfer is initiated by E-UTRAN for a user equipment in RRC_CONNECTED mode when the network needs, e.g. additional, UE radio access capability information. If the user equipment has changed its E-UTRAN radio access capabilities, the user equipment shall request higher layers to initiate the necessary NAS procedures as specified by 3GPP that would result in the update of UE radio access capabilities using a new RRC connection. The UE Radio Capability is not provided directly from one CN node to another. It will be uploaded to the MME when the E-UTRAN requests the UE Radio Capability information from the user equipment.

The UE capability may be transferred over the SLs interface. SLs is the interface between the MME and the positioning node, e.g. the E-SMLC. The interface is used to convey LCS Application Protocol (LCS-AP) messages between these two nodes. The initiator, e.g. the MME, of the location service request procedure sends a Location Request (LR) message to E-SMLC for the target user equipment and starts the timer T3x01. Among the other things, the message comprises an optional element "UE Positioning Capability (O)". When the UE capability is unknown, the E-SMLC may request UE position capability through LPP.

The UE positioning capability provides information about the LCS capabilities of the target UE and comprises only a single information element, LPP Support, which is a mandatory binary indicator. TRUE means the LPP is supported by the user equipment.

Capability transfer in the LTE positioning architecture is supported in the LPP. The LPP capability transfer procedure comprises a request, e.g. RequestCapabilities, sent from the server to the target, and a response, e.g. ProvideCapabilities, sent from the target to the requesting serve. The LPP capability further comprises an indication procedure used by the target to provide unsolicited capabilities to the server. In both cases, the capability is transferred from a target to a server, where in the 3GPP EPS Control Plane solution typically the user equipment is the target device and the E-SMLC is the server. However, the target device may also be any radio node being positioned, e.g., small radio base station, relay, etc. For SUPL 2.0 support, the SUPL Enabled Terminal (SET) is the target device and the SLP is the server.

LPP procedures are not required to occur in any fixed order, e.g., the target device may transfer capability information to the server, i.e. the positioning server such as, E-SMLC or SLP, at any time if not already performed. The target device may be a UE, a small BS, relay, femto BS, etc. When a target device receives a RequestCapabilities message, it may include the device capabilities for each method included in the request for capabilities and deliver the response to the lower layers for transmission. If the message type is an LPP RequestCapabilities and some of the requested information is not supported, the target returns any information that may be provided in a positioning response.

The requestCapabilities comprises the capabilities for A-GNSS, OTDOA, ECID, as well as common capabilities and epdu capabilities. The OTDOA and ECID requestCapabilities information elements are currently defined as empty sequences. The commonIEsRequestCapabilities information element is provided for future extensibility. The epdu-RequestCapabilities are defined as an EPDU-Sequence comprising information elements that are defined externally to LPP by other organizations.

ProvideCapabilities has a similar structure to that of RequestCapabilities. In the current standard, for OTDOA, the target node may inform the server about the supported positioning mode. Only UE assisted positioning is supported so far. For E-CID, the target informs about the supported E-CID measurements, e.g., RSRP, RSRQ, and UE receive-transmit time difference.

In LPP, at most three different frequencies may be included in the neighbor cell list, excluding the reference cell, and where the neighbor cell list may or may not include the serving cell. At least the following related issues have been identified. There is no mechanism in the positioning node to choose cells for including in the assistance data when cells on several frequencies are available. The positioning server needs to know the frequencies and RATs that may be used or preferred by the user equipment for transmitting positioning measurements to.

The set of frequency layers that may be monitored by the user equipment at the same time is limited, although these layers may be monitored also for other purpose than positioning and thus fewer frequencies may be available for positioning measurements. For example, with the maximum number of monitored frequency layers in measurement gaps equal to 7, the following example measurements configurations may be envisioned:
  3 LTE FDD inter-frequencies+1 LTE TDD inter-frequency+2 WCDMA layers+1 GSM.
  2 LTE FDD inter-frequencies+2 LTE TDD inter-frequency+3 GSM.

The current RSTD measurement requirements specified in 3GPP are defined only for two carrier frequencies, being the serving-cell frequency and the neighbor-cell frequency, which may several problems. There is no mechanism in the positioning node to account for this in the assistance data build up. The user equipment may receive a neighbor cell list implying more than the two allowed frequencies and there is no rule specifying to which frequencies the current requirements shall apply at the user equipment side. For instance the user equipment supporting more than two carrier frequencies which are also included in the neighbor cell list, may choose any two of these frequencies for performing inter-frequency RSTD measurements. Since the user equipment behavior of selecting the frequencies when more than 2 frequencies are signaled is not specified, hence there is a risk that the user equipment may choose e.g. not to perform the inter-frequency RSTD measurements at all on one of the frequencies. These unspecified user equipment behaviors are undesirable from the network performance point of view.

The positioning node supports only E-UTRAN measurements. At t the same time, LPP allows for a reference cell to operate on a frequency different than the serving cell. As a result, some of the possible issues are that a reference cell in the neighbor cell list may not be on the serving-cell frequency and the requirements thus may not apply. Furthermore, the positioning node does not know exactly whether the user equipment has to perform inter-frequency measurements. This may impact the assistance data build up, i.e. the inter-frequency measurements may take longer time for the user equipment to measure and be less accurate, the applicability of the RSTD requirements and/or the measurement gap configuration when the latter is triggered or involves the positioning node.

The positioning node is currently not aware of the duplex mode of the cell i.e. whether a cell is an FDD, half duplex FDD (HD-FDD) or TDD cell. In some embodiments, there may be a mix of them in the system.

The positioning node is also not aware of the duplex operation of terminals. Also, the system is not aware of the configuration of TDD cells, whilst some cells may use TDD uplink-downlink subframe configurations for which RSTD requirements do not apply.

Furthermore, the user equipment needs to know the duplex mode of the cell, i.e. whether a cell is FDD, HD-FDD or TDD, in order to correctly apply PRS configuration defined in 3GPP, which specifies the number of consecutive DL subframes, e.g. only DL subframes are counted, which is also assumed to be known when it comes to RSTD requirements.

The radio node, e.g., an eNodeB, capabilities are not defined by the standard and so far may only be provided to the positioning node by a Operations & Maintenance (O&M) node or by locally configuring the positioning node. One of problems that may arise is that there is no standardized interface and corresponding signaling defined to communicate radio node capabilities to the positioning node. Furthermore, different radio nodes, e.g. eNode B or any BS, may differ in terms of their capabilities e.g. in terms of supported frequency bands, hardware capability, bandwidths supported in certain frequency band, transmit power level, receiver type etc. A very large number of radio nodes may be under the influence of the same positioning node for the purpose of positioning. It is very cumbersome for an operator to provide the radio node capability and associated information to the positioning node by manual means such as via O&M. The manual configuration task may become even more tedious in case the radio nodes belong to different manufactures. In addition, there is no mechanism in the positioning node to account for these capabilities in the assistance data build up.

SUMMARY

An objective of embodiments herein is therefore to obviate at least one of the above disadvantages and to provide enhanced inter-frequency/inter-RAT and multi-duplex operation of a positioning system comprised in a communications network.

The embodiments herein relates to acquiring information necessary for inter-frequency and multi-duplex operation relating to positioning in a communications system. Information such as the serving cell frequency, RAT, monitored frequency layers, duplex mode of a cell, configuration of TDD cells etc in addition to radio network node capabilities. The positioning node accounts for this information and capabilities in the assistance data build up, which is further used in positioning measurements. By using the acquired information, enhanced positioning measurements are provided.

A positioning node chooses cells for including in the assistance data when cells on several frequencies are available. The positioning node acquires the frequencies and RATs that may be used or preferred by the target node for positioning measurements. The positioning node is able to specify which carrier frequencies the target node shall apply, when the target node supports more than two carrier frequencies.

According to a first aspect, the objective is achieved by a method in a positioning node for handling measurements in a communications network. The positioning node acquires information about a set of carrier frequencies, comprising information about at least a channel number for each respective carrier frequency in the set and information about a bandwidth for each of the respective the carrier frequencies in the set. The set of carrier frequencies comprises at least one carrier frequency. The positioning node selects at least one carrier frequency based on the acquired information. The positioning node sends information about the selected at least one carrier frequency to a first node or a target node. The information further comprises at least a channel number for the selected carrier frequency and a bandwidth for the selected carrier frequency, enabling the first node to perform measurements for a target node using the selected f carrier frequency.

According to a second aspect, the objective is achieved by a method in a first node for handling measurements in a communications network. The first node sends, to a positioning node, information about a set of carrier frequencies. The information comprises at least a channel number for each of the respective carrier frequencies in the set of carrier frequencies and information about a bandwidth for each of the respective carrier frequencies in the set. The set of carrier frequencies comprises at least one carrier frequency.

According to a third aspect, the objective is achieved by a positioning node for handling measurements in a communications network. The positioning node comprises an acquiring unit configured to acquire information about a set of carrier frequencies, comprising information about at least a channel number for each respective carrier frequency in the set and information about a bandwidth for each of the respective the carrier frequencies in the set. The set of carrier frequencies comprises at least one carrier frequency. The positioning node further comprises a selecting unit which is configured to, at least one carrier frequency based on the acquired information. The positioning node comprises a sending unit which is configured to send information about the selected at least one carrier frequency to a first node or a target node. The information further comprises at least a channel number for the selected carrier frequency and a bandwidth for the selected carrier frequency, enabling the first node to perform measurements for a target node using the selected carrier frequency.

According to a fourth aspect, the objective is achieved by a first node for handling measurements in a communications network. The first node comprises a sending unit configured to send, to a positioning node, information about a set of carrier frequencies. The information comprises at least a channel number for each of the respective carrier frequencies in the set of carrier frequencies and information about a bandwidth for each of the respective carrier frequencies in the set. The set of carrier frequencies comprises at least one carrier frequency.

Since the positioning node is aware of about multi-frequency, frequency-specific, e.g. bandwidth, because of the multi-duplex configuration of radio network nodes and the user equipment involved in positioning and exploiting the obtained information, enhanced inter-frequency/inter-RAT and multi-duplex operation of a positioning system comprised in a communications network is achieved.

Embodiments herein afford many advantages, of which a non-exhaustive list of examples follows:

An advantage of the embodiments herein is that it provides enhanced positioning performance in multi-frequency and multi-RAT network.

Another advantage is the increased awareness of positioning server about multi-frequency, frequency-specific, e.g. bandwidth, and multi-duplex configuration of radio nodes and UE involved in positioning and exploiting the obtained information for enhancing positioning.

A further advantage is that there is no ambiguity in interpreting inter-frequency RSTD requirements when more than two frequencies are involved. Furthermore, embodiments herein minimize the amount of inter-frequency measurements while exploiting the serving cell frequency information in the positioning node. The embodiments herein enables proper configuration of Location Measurement Unit (LMUs) for UTDOA measurements, while exploiting the serving cell information. Furthermore, the embodiments herein increase the awareness of the positioning node about the base station configuration and exploiting this knowledge in the assistance data build up. Another advantage, is that the embodiments herein accounts for TDD configuration and thus enhancing positioning performance in TDD A further advantage is that the embodiments herein provide enhanced signaling support for inter-frequency operation for positioning.

Furthermore, an advantage of the embodiments herein is the rules for applicability of the requirements specified for a smaller number of frequencies than indicated in the assistance data.

Another advantage of the embodiments herein is related to multi-duplex operation.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein. The drawings illustrate example embodiments, without limiting the scope of the invention.

DETAILED DESCRIPTION

Figure 1A:
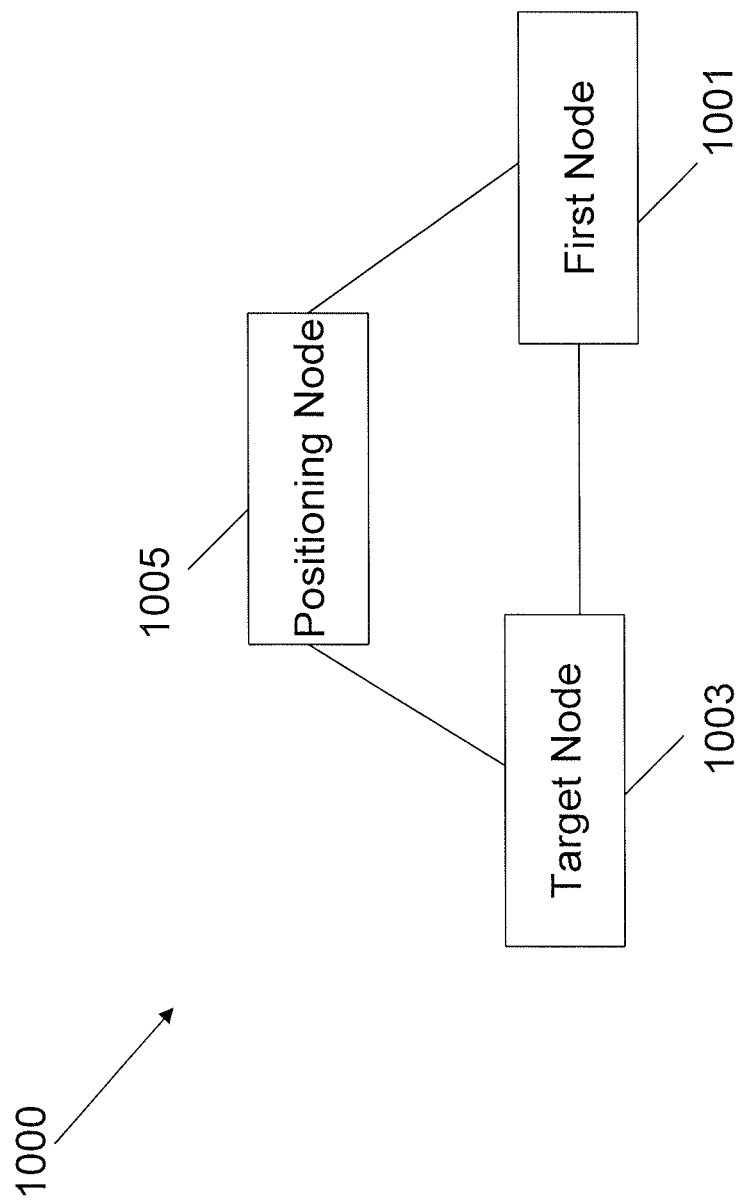
FIG. 1a-b are schematic block diagrams illustrating embodiments of a communications network.

FIG. 1a depicts a communications network 1000 in which embodiments herein may be implemented. The communications network 1000 may in some embodiments apply to one or more radio access technologies such as for example LTE, LTE Advanced, WCDMA, GSM, or any other 3GPP radio access technology. WiFi, cdma2000, WiMAX, any other IEEE radio access technology. It may also comprise single- or multi-carrier system, FDD or TDD, single- or multi-RAT system, where an example of multi-RAT system is multi-standard radio (MSR) system.

The wireless communications network 1000 illustrated in FIG. 1a comprises a first node 1001, a target node 1003 and a positioning node 1005 connected to each other. The first node 1001 may be a user equipment, a radio network node, a radio base station or an LMU. The target node 1003 may be a user equipment, an LMU, a relay, a beacon device, a terminal, a laptop or a small radio base station. The positioning node 1005 may be a node comprised in e.g. a user equipment or a separate node. The different node alternatives are described in more detail below.

The first node 1001, the target node 1003 and the positioning node 1005 is connected to each other via communication links. In some embodiments, all links shown in FIG. 1a may be present. In some embodiments, only some of the links shown n FIG. 1a are present. For example, there might not be any direct link between the target node 1003 and the positioning node 1005. The target node 1003 and the positioning node 1005 may communicate with each other via the first node 1001. The communication links between the nodes depicted in FIG. 1a may be logical links. e.g. via higher-layer protocols, or direct links. The links may comprise any one or a combination of fixed and/or wireless links.

Figure 1B:
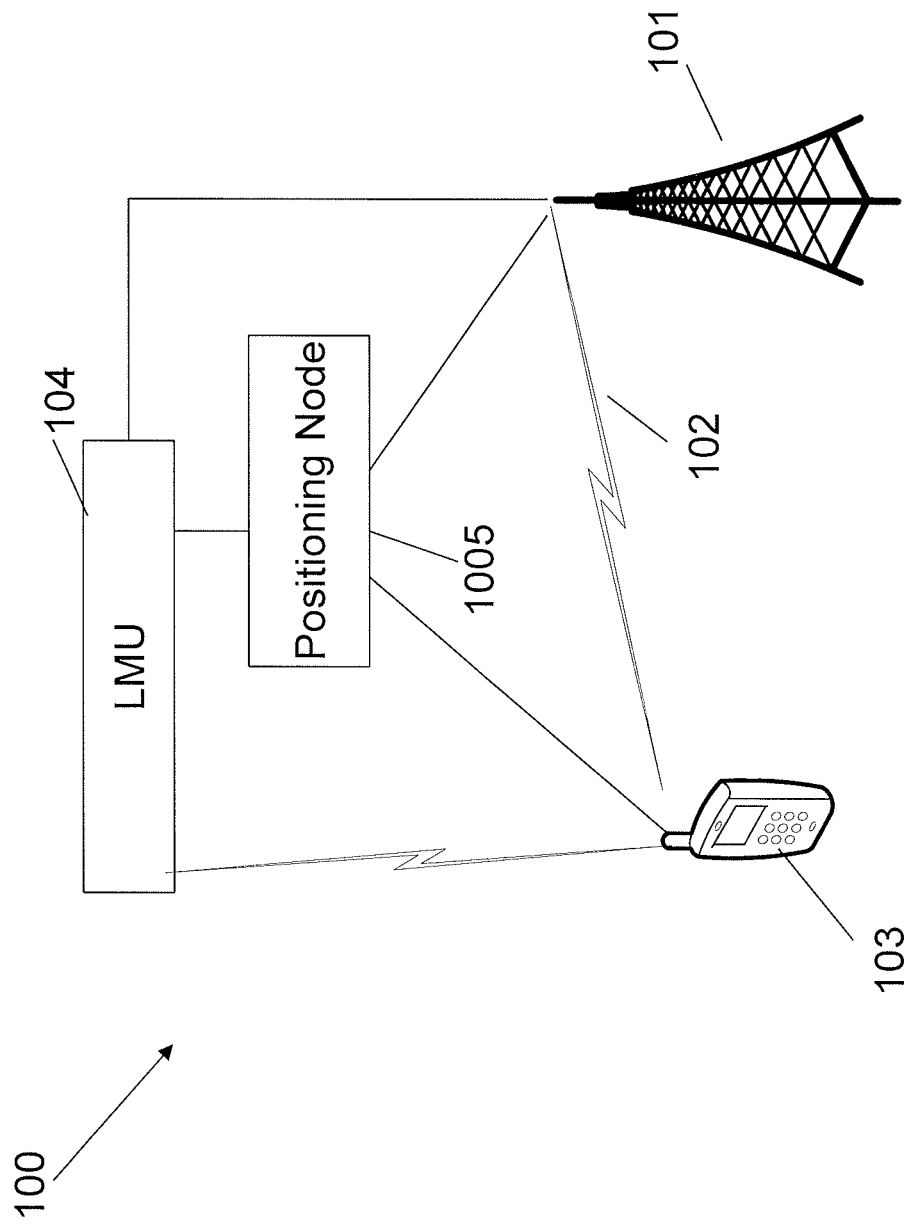

FIG. 1b illustrates an embodiment of the wireless communications network 1000 shown in FIG. 1a. The wireless communications network 100 comprises a transmitting node 101. The transmitting node 101 may be a base station (BS), NodeB, evolved NodeB (eNB), relay, beacon, etc., i.e. any device transmitting signals over a radio carrier 102 to be measured by a terminal 103. The radio link 102 may also be referred to as a radio channel or radio carrier. The transmitting 101 is located in the RAN-part of the communications network 100, and is therefore referred to as a radio network node 101. The transmitting node 101 will in the following description be referred to as a base station 101. A typical RAN may comprise a plurality of base stations 101 and a plurality of terminals 103. As mentioned above, a cell is a geographical area where radio coverage is provided by the radio base station at a base station site. By controlling the transmission power of the base station 101 serving the cell, the radio frequencies assigned to one cell can be limited to the boundaries of that cell.

In FIG. 1b, the communications network 100 comprises a radio measurement unit such as a Location Measurement Unit (LMU) 104. In some embodiments, the radio measurement unit, being a receiving node, may perform UL radio measurements on signals transmitted by the terminal 103. In other embodiments, the radio measurement unit, being a receiving node, may perform DL radio measurements on signals transmitted by other radio nodes, e.g., transmitting node 101. In some embodiments the LMU 104 may communicate, e.g., via an interface to the transmitting node 101, as illustrated in FIG. 1a. In some embodiments, LMU 104 may be integrated into the transmitting node 101. In some embodiments, the LMU 104 does not have any interface towards the transmitting node 101. The LMU 104 is responsible for uplink radio measurements to support positioning, although in some embodiments it may also play the terminal role, for example, when the LMU is being positioned itself and thus performs measurements for own positioning.

When performing UL measurements, the LMU 104 may receive assistance data, e.g., from a positioning node 1005. The positioning node 1005 may thus select to which LMUs 104 the assistance data is to be signaled to enable measurements on radio signals transmitted by the terminal 103, which measurements are then to be used for positioning the terminal 103. The positioning node 1005 will be described in more detail below. The LMU 104 may receive signals, it does not "talk" to the terminal 103. Even though FIG. 1a illustrates one LMU 104, the communications network 100 may, in some embodiments, comprise a plurality of LMUs 104. In some embodiments, an LMU may be viewed as a measuring node referred to as a "terminal" as explained above, whilst the terminal may be a transmitting radio network node.

The terminal 103 may be any suitable communication device or computational device with communication capabilities for communicating with the base station 101 over the radio carrier 102, for instance but not limited to terminal, mobile phone, smart phone, personal digital assistant (PDA), laptop, MP3 player or portable DVD player, or similar media content devices, digital camera, or even stationary devices such as a PC. A PC may also be connected via a mobile station as the end station of the broadcasted/multicasted media. The terminal 103 herein may be understood as a non-limiting terminology referring to any device or node whose position is determined by the terminal itself or by any other node such as positioning node, e.g., E-SMLC or SLP in LTE. Some examples of a terminal are UE, terminal, mobile, laptop, small base station, home eNodeB, relay, beacon device, LMU, etc. The terminal 103 will in the following be referred to as user equipment 103, and is referred to as UE in some of the figures. In the following, the terms UE, terminal, and positioning target are used interchangeably, unless explicitly stated otherwise. In some embodiments, a terminal may physically be a radio node but it may still have the characteristics described herein for a terminal, e.g., a femto base station being positioned may also perform measurements on DL signals transmitted by other radio nodes and report measurements to the positioning server. In some embodiments, the communications network 100 may comprise a plurality of user equipments 103.

The positioning node 1005 is comprised in the communications network 100. In some embodiments, the positioning node 1005 is a node in the communications network 100, e.g. in the core network or the radio access network. The positioning node 1005 may receive a request for positioning the target node 1003 from first node 1001, e.g., SON node, MME, MDT node, etc., a radio network node, e.g., eNodeB, or a wireless device which may be a user equipment 103. In some embodiments, e.g. when the user equipment 103 determines its position itself, the positioning functionality may be in a user equipment. In other embodiments, the positioning functionality may be split, e.g., the user equipment 103 receives positioning assistance data from a base station 101 but calculates itself its own position. In the following, the terms positioning server and positioning node are used interchangeably.

In some embodiments, the positioning node 1005 is an entity comprised in the user equipment 103. When the positioning node 1005 is comprised in the user equipment 103, the user equipment 103 performs positioning or determines the location itself, e.g. corresponding to UE-based positioning, using the positioning node 1005. In other words, the user equipment 103 may request the position internally, by requesting the internal positioning node 1005.

In some embodiments, positioning node does 1005 not measure anything, it receives measurements from other nodes, e.g., DL measurements from UE, or other radio node performing DL measurements e.g. small BS, relay, LMU, or UL measurements from LMU or eNB.

The embodiments herein relate to capability signaling enhancing positioning in a communications network 1000. Furthermore, the embodiments herein disclose methods procedures and apparatus for acquiring the information necessary for inter-frequency and multi-duplex operation of a positioning system, which may be affecting positioning requirements. Such enhanced signaling support is useful for enhancing positioning in networks with inter-frequency and/or multi-duplex operation for positioning. In the following, reference is made to the nodes illustrated in FIG. 1a, where the communications network 1000 comprises a first node 1001, a target node 1003 and a positioning node 1005 connected to each other. The first node 1001 may be a user equipment 103, a radio network node 101, a radio base station 101 or an LMU 104. The target node 1003 may be the user equipment 103, an LMU 104, a relay, a beacon device, a terminal, a laptop or a small radio base station. The positioning node 1005 may be comprised in e.g. a user equipment 103 or is a separate node.

The embodiments herein aim at enhancing inter-frequency and multi-duplex operation of a positioning system. In some embodiments the positioning node 1005 may acquire radio network node frequency-related information. In some embodiments, the applicability of RSTD requirements when the number of frequencies exceeds a certain number may be specified. In some embodiments, the first node 1001 may account for the applicability of RSTD requirements when the number of frequencies exceeds a certain number. Furthermore, the positioning node 1005 may select inter-frequencies when configuring inter-frequency measurements and building up assistance data for inter-frequency measurements, and acquire duplex-related information, e.g. duplex mode, or specifically TDD-related information, e.g. uplink-downlink configuration or special sub-frame configuration, or subframe configuration information in general, e.g. a pattern indicating low-interference subframes e.g. in heterogeneous network deployments, and utilizing this information for positioning. In some embodiments, the user equipment 103 acquires duplex information. In some embodiments, the terminal frequency information may be enhanced by the user equipment 103 transmitting to the positioning node 1005 a set of frequencies. The set of frequencies may comprise reserved or preferred frequencies, reserved or preferred specifically for OTDOA measurements, or a set of frequencies which is different from the set of all frequencies supported by the user equipment 103.

The embodiments herein specify capability information elements for signaling eNodeB positioning capabilities to the E-SMLC over LPPa or via other protocols and interfaces.

According to the embodiments herein, general user equipment radio access capabilities are transferred to the positioning node 1005, which enables enhancing the positioning node awareness about the UE capabilities. This is further complemented with the information currently available in the base station 101, which is also available in the positioning node 1005. Furthermore, there are rules specifying to which frequencies the current requirements shall apply at the user equipment side. The positioning node 1005 account for this in the assistance data build up.

The user equipment 103 may receive a neighbor cell list implying more than the two allowed frequencies and the embodiments herein provide rules specifying to which frequencies the current requirements shall apply at the user equipment side. For instance the user equipment 103 supporting more than two carriers, which are also included in the neighbor cell list, may choose any two of these frequencies for performing inter-frequency RSTD measurements. Since the user equipment 103 knows how to behave for selecting the frequencies when more than 2 frequencies are signaled, hence there is no risk that the user equipment may choose e.g. not to perform the inter-frequency RSTD measurements at all on one of the frequencies.

According to the embodiments, herein RSTD measurement requirements specified in 3GPP may be defined for two or more frequencies, being e.g. the serving-cell and neighbor-cell frequencies.

The positioning node 1005 is aware of the serving cell frequency and RAT. A reference cell in the neighbor cell list may be on the serving-cell frequency. The positioning node 1005 knows exactly whether the user equipment has to perform inter-frequency measurements which may impact the assistance data build up, i.e. the inter-frequency measurements takes shorter time for the user equipment 103 to measure and are accurate, the applicability of the RSTD requirements and/or the measurement gap configuration when the latter is triggered or involves the positioning node 1005.

Figure 2:
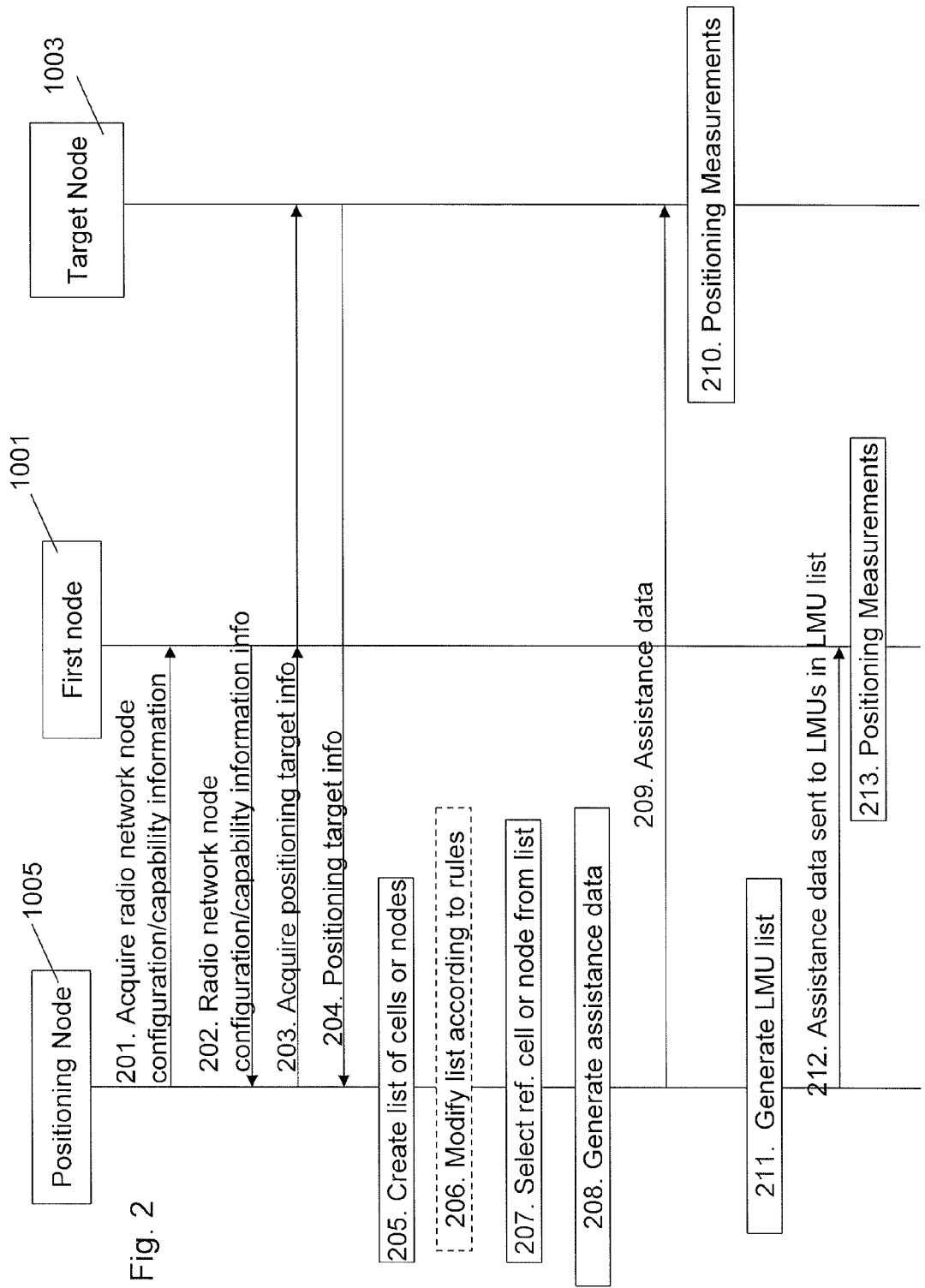
FIG. 2 is a combined signaling diagram and flow chart illustrating embodiments of a method.

FIG. 2 is a signaling diagram illustrating a non-limiting example of a logical scheme of embodiments of a method depicting enhancement of positioning measurements with the base station and user equipment configuration/capability information. Either one of the Step 201 and Step 203 or both steps may be performed. The order of the steps is an example order, which may be different in other implementations.

Step 201

The positioning node 1005 acquires the radio network node configuration/capability information from the first node 1001. The information comprises e.g. at least one of
- frequency-related information,
- duplex-related information, e.g. duplex mode,
- TDD-related information, e.g. uplink-downlink configuration or special subframe configuration,
- subframe configuration information in general, e.g. a pattern indicating low-interference subframes e.g. in heterogeneous network deployments,
- information related to the serving cell or the donor or the associated cell, i.e. a macro cell associated with relay or a beacon;
- node radio-frequency capability or a set of configured or preferred frequencies or RATs,
- the base station's 101 positioning capability.

The different types of information will be described in more detail later.

In some embodiments, the information is not necessarily obtained upon a request, but may also be e.g., just received, for example, periodically or upon a trigger in the sending node.

Step 202

The positioning node 1005 receives the radio network node configuration/capability information from the first node 1001.

Step 203

The positioning node 1005 acquires, from the positioning target node 1003, e.g. user equipment 103, information related to the positioning target node 1003, e.g. the user equipment 103, where the information comprises e.g. at least one of:
- serving cell ID information mandated to be sent by the user equipment 103,
- serving cell frequency-related information mandated to be sent by the user equipment 103,
- user equipment-configured/terminal-preferred list of frequencies and/or RATs, where the list of frequencies differs at least in one frequency from the list of frequencies supported by the user equipment 103,
- list of frequencies that the user equipment 103 may reserve for the measurements in question,
- duplex-related information, e.g. operated duplex mode or the related capability;
- TDD-related configuration followed by the user equipment 103, e.g. uplink-downlink configuration or special subframe configuration;
- measurement subframe configuration information in general, e.g. a pattern indicating subframes used for measurements e.g. in heterogeneous network deployments.

The set of preferred or reserved frequencies is generated while taking into account the current set of frequency layers monitored for positioning and/or other purposes. In one embodiment, the set of monitored/preferred/reserved frequencies in subframes used for positioning measurements is different from that used in other subframes.

The step 203 may also be between the first node 1001 and the positioning node 1005, for example when UTDOA is used and LMUs 104 are involved.

Step 204

The positioning node 1005 receives the information related to the positioning target from the positioning target 1001, e.g. the user equipment 103.

The step 203 may also be between the first node 1001 and the positioning node 1005, for example when UTDOA is used and LMUs 104 are involved.

Step 205

The positioning node 1005 creates a list of frequencies and cells or base stations 101, e.g. radio network nodes, within each frequency that satisfy the user equipment 103 and the radio network node capabilities, preferences or configurations acquired in Steps 201 and 203. In some embodiments, the list may be sorted, ordered in the decreasing order of priority according to some priority.

Step 206

This is an optional step, which is illustrated by the dashed box. The positioning node 1005 may select the reference cell or node from the list created in step 205. In OTDO, a reference cell is selected. In UTDOA, an LMU 104 is selected. The positioning node 1005 may use the reference cell or node as a reference in the assistance data. For UTDOA, reference LMU 104 may be selected a reference node involved in time difference measurements comprising the difference between one cell timing and reference cell/node timing. When selecting a reference cell, a flag or an indicator may be set for the selected reference cell.

Step 207

The positioning node 1005 modifies the list according to certain rules. If the number of frequencies in the cell priority list exceeds a maximum limit, the positioning node 1005 removes cells from the list. The following rules may be used:
- remove cells operating in a different duplex mode than the reference cell, e.g. keep only FDD or TDD,
- remove one-by-one frequencies, i.e. and cells, with the least number of cells,
- remove one-by-one frequencies, i.e. and cells, with the least number of cells with required bandwidth,
- remove frequencies and cells with worse propagation conditions,
- remove frequencies and cells with the worst inter-frequency measurement quality statistics,
- remove frequencies and cells with the worst estimated or measured received signal strength or quality in the zone of interest.

In the above, a cell may be a plurality of cells and/or radio network nodes.

The modification is necessary to be able to guarantee the performance in the case of more than 2 frequencies.

Step 208

The positioning node 1005 generates the assistance data and/or configures inter-frequency measurements and/or configures inter-RAT measurements. Inter-frequency measurements may be measurements on downlink physical channels at frequencies that differ from the frequency of the active set.

Assistance data may comprises, among the other things, reference cell information, a neighbor cell list containing PCIs of neighbor cells, the number of consecutive downlink subframes, PRS transmission bandwidth, carrier frequency, etc.

Step 209

The positioning node 1005 sends the generated assistance data and configuration information to the positioning target 1003, e.g. the user equipment 103.

Step 210

The target node 1003, e.g. the user equipment 103, performs inter-frequency measurements and/or inter-RAT measurements based on the assistance data and configuration information from the positioning node 1005. Furthermore, the position of the target node 1003 may be calculated based on the measurements.

Step 211

The positioning node 1005 generates a list of cooperating first nodes 1001, e.g. cooperating LMUs 104. LMUs 104 are cooperating LMUs 104 if they involved in positioning the same target node 1003, e.g., performing its UL measurements at different locations.

Step 212

The positioning node 1005 dynamically configures/reconfigures the first node 1001, e.g. LMUs 104 on the generated list for measurements. In other words, the positioning node 1005 sends the assistance data to first nodes 1001, e.g. the LMUs 104, in the list.

Step 213

The first node 1001, e.g. the LMU 104, performs inter-frequency measurements and/or inter-RAT measurements based on the assistance data.

At least one of Steps 208-212 applies, depending on the previous steps and the positioning system and the positioning method. The positioning system implies the positioning node 1005 and other nodes, which may include LMUs 104.

In some embodiments, steps 208, 210 and 211,213 may or may not occur in the same order as described above. The steps 211-213 do not necessarily occur in the same network together as steps 209-210, The steps above illustrated in FIG. 2, will now be described in more detail.

In some embodiments, base station frequency-related information may be acquired. This relates to the frequency information described in step 201 and step 202 in relation to FIG. 2 above.

The positioning node 1005 is enabled to acquire the information related to the carrier frequencies supported by the radio network node 101 such as eNodeB or any type of base station. Information is carried over the radio link 102 on a radio frequency carrier signal at a certain frequency which is called the carrier frequency. The frequency is measured in Hertz (Hz). The information may comprise one or more of the following but not limited to:
1. Carrier frequency number of each supported carrier in a first node 1001 e.g. EARFCN in LTE.
2. Channel bandwidth of the supported carrier frequencies.
3. Frequency band associated with each supported carrier frequency if necessary,
4. RAT associated with frequencies.
5. Set of frequencies that is optimized or preferred for positioning, e.g. with transmitted PRS and/or configured low-interference subframes to enhance positioning measurements.

In one embodiment, the information relates at least in part to the radio network node capability.

The frequency-related information or sub-set of it may be obtained in different ways. In some embodiments, the information may be obtained via the user equipment 103, or obtained directly from the base station 101 to which the information relates. In some embodiments, the information may be obtained via core network node(s), or via an O&M node. The different embodiments are described in more detail below.

The information may be collected pro-actively or requested from the respective nodes as described above. The information may be acquired over the control plane or user plane signaling or both.

The collected information may be used e.g. for building up a database from where the frequency-related information may be acquired on the need basis, for example, for a given cell identification, and/or for a particular method, e.g. OTDOA or UTDOA.

In case the frequency-related information is used for enhancing uplink measurements, the frequency-related information may be used for building up the list of cooperating LMUs 104 for a particular serving cell or for a particular user equipment 103. In some embodiments, the frequency-related information may be used for dynamically configuring and reconfiguring LMUs 104, e.g. to allow for measuring over multiple frequencies at the same LMUs 104. In some embodiments, the frequency-related information may be signaled to LMUs 104 over a standardized or a proprietary interface e.g. in relation to a measurement request for a certain user equipment 103.

In some embodiments, the information may be obtained via the user equipment 103. As mentioned above, in some embodiments, the UE 103 may provide at least its serving cell frequency information to the positioning node 1005 e.g. to E-SMLC via LPP signaling in LTE. The UE 103 may also be able to provide the frequency-related information of additional carriers, i.e. other than the serving one, supported by its serving radio network node 101, e.g. the eNode B. In some embodiments, the UE 103 may have additional information if it has been served by other carriers by the same radio network node 101.

The UE 103 may also acquire such additional information, e.g. cell global identifier which may be complemented with e.g. the frequency and RAT information, by the virtue of specific inter-frequency measurements.

Over a period of time the information provided by the UEs 103 thus assists the positioning node 1005 to build a database of the carrier frequencies supported by the radio network nodes 101, and the database may also be further enhanced with other available information and which may potentially be involved in positioning. The database may be stored in a computer readable memory unit in the positioning node 1005. In one embodiment, the database is filled in with the data by processing Minimizing Drive Test (MDT) reports. In another embodiment, the database is provided by O&M.

As mentioned above, in some embodiments, the frequency-related information may be obtained directly from the base station 101 to which the information relates. The base station 101, e.g. eNodeB, may be able to provide comprehensive frequency-related information, i.e. all supported carriers, bands, BandWidths (BWs), RATs, etc to the positioning node 1005. In some embodiments, the information may be signaled to the positioning node 1005, e.g. E-SMLC, via LPPa in LTE. The eNodeB 101 may additionally indicate which of the carriers are used for positioning purpose i.e. which ones transmit positioning reference signals for enabling the UE 103 to perform the positioning measurements.

As mentioned above, in some embodiments, the frequency-related information may be obtained via a core network node. According to some embodiment the core network node, e.g. MME in LTE, provides the frequency-related information of the radio network node 101 to the positioning node 1005 e.g. MME to E-SMLC via LCS-AP signaling means. The core network node in turn acquires e.g. the radio network node frequency-related information in terms of supported frequencies etc either directly from the network node or via configuration.

In some embodiments, serving cell frequency information for a specific UE 103 may be acquired, and the information may be utilized positioning. This is related to step 203 and step 204 in FIG. 2.

In some embodiments, a UE 103 may optionally send the serving cell ID in the request for assistance data via LPP. In some embodiments, communicating this information to the positioning node 1005 is mandated to ensure that e.g. inter-frequency measurements are not requested by the positioning node 1005 without a need. In another embodiment, the information may be updated in the positioning node 1005 at UE inter-frequency handover. Upon receiving the cell ID information, the positioning node 1005 acquires the frequency-related information for the given cell ID e.g. by one of the methods described above.

In some embodiments, the frequency information, e.g. the serving cell frequency, is signaled in the request for assistance data, where the request may be sent e.g. by the UE 103.

In some embodiment, the serving cell information is acquired by extracting the path over which the UE 103 communicates with the positioning node 1005 and further obtaining the frequency-related information for the obtained cell identification from e.g. O&M system, a database in the positioning node 1005 or requesting it from the radio network node 101.

The serving cell frequency-related information may be used by the positioning node 1005 e.g. for configuring receiving nodes such as LMUs 104 to perform measurements, e.g. for UTDOA, for the given UE 103 on the acquired frequency and/or over the acquired bandwidth and/or in the acquired RAT.

The serving cell frequency-related information may also be used by the positioning node 1005 when building up the assistance data e.g. for OTDOA e.g. for avoiding or minimizing inter-frequency/inter-RAT measurements. The latter may be achieved e.g. by prioritizing for including in the cell list signaled in the assistance data the cells operating on the same frequency as the serving cell, especially for UEs 103 that require measurement gaps for inter-frequency and inter-RAT measurements.

The applicability of RSTD requirements may be related to when the number of frequencies exceeds the number of frequencies for which the requirements are defined.

In some embodiments, the number of frequencies for which the requirements are defined is two—one for the serving cell, not necessarily the reference cell, and one for neighbor cells.

The methods described in this section may be implemented e.g. in positioning testing equipment, but they may also be further utilized in user equipments 103 for organizing user equipment measurements and positioning node 1005 e.g. when building up assistance data.

This embodiment discloses a method in a positioning node 1005 of selecting the most appropriate carrier frequencies to be used by the UE 103 for performing inter-frequency positioning measurements. The rules governing the selection of the appropriate frequencies are particularly useful when the first nodes 1001 do not fully bear identical frequency capabilities, and/or when the UEs 103 do not fully bear identical frequency band capabilities.

The above points are first elaborated below with examples. Subsequently the rules to derive the most appropriate frequencies are described.

A radio network node 101 may be capable of supporting multiple carrier frequencies e.g. F1, F2 and F3. Furthermore the set of the carrier frequencies supported by different radio network nodes 101 may not be fully identical e.g. eNodeB-1 may support F1, F2 and F3 whereas eNodeB-2 may support F1, F2 and F4. Yet different radio network nodes 101 supporting the same frequency may not support identical bandwidths. For example, eNodeB-1 and eNodeB-2 may support channel bandwidths of 5 MHz and 20 MHz over the same carrier frequency F1. As above, the positioning node 1005 acquires these capabilities of the radio network nodes 101 by a suitable mechanism.

Different UEs 103 may also have different set of frequency band capabilities. A UE 103 is required to support all carriers in its supported band. For example, UE-1 may support bands B1, B2 and B3, whereas UE-2 may support only bands B1 and B4. The carrier frequencies F1, F2, F3 and F4 belong to bands B1, B2, B3 and B4, respectively.

In some embodiments, the most suitable carriers for inter-frequency measurements may be derived. One of the following rules may be used by the positioning node 1005, while taking into account the carrier frequency-related information of the radio network node 101 and the frequency-related information of the UE 103:

Selection based on common supported frequencies,
Selection of common supported frequencies with largest BWs or BWs in a certain range, e.g. over 5 MHz,
Selection based on static and semi-static information,
Selection based on static, semi-static and dynamic information.

Fundamentally the term 'supported carrier frequencies' refers to the set of carriers which are part of the radio network node capability. This means the radio network node 101, e.g. eNode B or any base station supporting them, should have the required hardware and radio units, e.g. RF filters and power amplifiers etc., to operate the supported frequencies which may even belong to different frequency bands. However in a particular radio network node 101 all the supported carrier frequencies may not be activated all the time i.e. they may or may not used currently. Hence the information about the 'supported carrier frequencies' provided to the positioning node 1005 comprises at least the radio network carrier frequency capability and their current status, whether they are activated or not. In case the first node 1001 is unable to provide both pieces of information then it may provide the information about the set of carrier frequencies which are currently used or activated.

The four rules mentioned above are described in detail below.

In one embodiment, the selection rules take also into account at least one of only those radio network nodes 101 and frequencies that are/may be configured for transmissions of signals used for positioning measurements, e.g. PRS, are selected. Furthermore, the selection rules may take into account the duplex mode or the number of subframes available for measurements is taken into account, e.g. only those cells that have at least X subframes available for measurements may be selected.

In some embodiments, the selection may be based on common supported frequencies. In this case, the positioning node first identifies the carrier frequencies, which are most commonly supported by a certain number of radio network nodes 101 in a coverage area or zone.

In one embodiment, each zone is associated with an area identity, e.g. tracking area identity. The zones may overlap. A particular carrier may not be used in all zones for several reasons.

The term 'supported carrier frequencies' in the embodiments in this section refers to the set of carriers which are part of the radio network node capability. This means the radio network node 101, e.g. eNode B or any base station supporting them, should have the required hardware and radio units, e.g. RF filters and power amplifiers etc., to operate the supported frequencies which may even belong to different frequency bands. However in a particular radio network node 101 all the supported carrier frequencies may not be activated all the time i.e. they may or may not used currently. Hence the information about the 'supported carrier frequencies' provided to the positioning node 1005 comprises at least the radio network carrier frequency capability. In addition the information may also indicate whether a particular node is capable of the PRS transmission or not. Thus, e.g. the commonly supported frequencies with PRS transmissions enabled may be selected.

A UE 103 is considered to be in a particular zone whose serving cell lies, at least partly, in that zone. According to this embodiment the UE 103 is requested to perform inter-frequency positioning measurements on the frequency, which is also part of UE capability, which is supported by most of the nodes in its zone or coverage area. This is illustrated by table 1 below. Assuming three UEs, UE-1, UE-2 and UE-3 are located in zones A, B and C, respectively. Furthermore, UE-1, UE-2 and UE-3 support bands B1, B4 and B5, bands B2, B5 and B7 and bands B1, B2, B3 and B7, respectively. Each UE 103 has a serving carrier frequency. The frequency which is supported by the UE 103 and is most commonly used in its zone after its serving carrier frequency is thus selected for the inter-frequency measurements. The rationale is that this will maximize the number of cells, which may be measured for performing inter-frequency measurements.

As stated above, in some embodiments, it is assumed that the positioning node 1005 only knows the radio network node frequency capability but not their status whether they are currently activated or not. Hence when selecting the frequency for the inter-frequency measurements according to table 1, it is assumed that all the supported carriers in the radio network nodes 101 are also activated or available or currently used. In case the some of them are not activated and the positioning node 1005 is aware of this fact then the positioning node may either request the radio network node 101 to activate the unused carriers or may ignore them, i.e. the unused carriers, when selecting the target frequency for the inter-frequency measurements.

TABLE 1

Principle for selecting the frequency for inter-frequency measurements based on principle of maximum supported frequencies

| Zone | Number of nodes in the Zone | Supported carrier frequencies by nodes | Number of nodes supporting particular frequency | UE band capability | UE serving carrier frequency | Selected frequency for inter-frequency |
|---|---|---|---|---|---|---|
| A | 30 | F1 | 30 | UE-1: B1, B4, B5 | F1 | F4 |
|   |    | F2 | 30 |   |    |    |
|   |    | F3 | 25 |   |    |    |
|   |    | F4 | 25 |   |    |    |
|   |    | F5 | 20 |   |    |    |
| B | 50 | F1 | 50 | UE-2: B2, B5, B7 | F2 | F7 |
|   |    | F2 | 50 |   |    |    |
|   |    | F3 | 45 |   |    |    |
|   |    | F5 | 40 |   |    |    |
|   |    | F6 | 50 |   |    |    |
|   |    | F7 | 45 |   |    |    |
| C | 35 | F2 | 30 | UE-3: B1, B2, B3, B7 | F3 | F2 |
|   |    | F3 | 35 |   |    |    |
|   |    | F4 | 35 |   |    |    |
|   |    | F6 | 25 |   |    |    |
|   |    | F7 | 20 |   |    |    |

In some embodiments, the selection may be based on common used frequencies. This embodiment is similar to the previous embodiment except that the positioning node 1005 comprises more comprehensive information related to the carrier frequencies supported by the radio network nodes 101. The information may include the following sets:

I. Carrier frequency capability of the radio network node 101;

II. Status of a particular carrier whether it is currently used or not in a particular first node 1001;

III. Whether the PRS can be or are transmitted on a particular carrier frequency or not;

IV. Whether the PRS are transmitted or not on the currently used carrier frequencies.

In this embodiment the comprehensive carrier frequency information of the radio network node 101 acquired by the positioning node 1005 by any means, i.e. via UE 103, radio network node itself 101, e.g. eNode B, relay node etc, via the core network e.g. MME or via O&M as described earlier should comprise at least the carrier frequency capability, set I, and at least one additional set of the remaining sets of the information cited above.

Hence in this embodiment the positioning node 1005 selects the frequency for the inter-frequency positioning measurements by using similar principles as described in table 1 above, but in addition also takes into account the additional set of information such as the used/configured/activated frequencies at radio network nodes 101 and may also consider only those carriers on which the PRS are configured. This selection method leads to the selection of more relevant and appropriate carrier frequencies for the inter-frequency positioning measurements but at the expense of requiring the acquisition of more detailed information related to the carrier frequencies used in the radio network nodes 101.

In some embodiments, the relevant statistics for a given UE 103 comprises only nodes for which the bandwidth satisfies a certain minimum requirement, e.g. 5 MHz. Further, is there is no cell satisfying this requirement, the set of selected cells may be empty. In another embodiment, the acceptable bandwidth depends on the requested positioning QoS or service class, e.g. emergency.

In yet one embodiment, the statistics accounts only for first nodes 1001, frequencies and bandwidths that are/may be configured for PRS transmissions.

TABLE 2

Principle for selecting the frequency for inter-frequency measurements based on principle of maximum supported frequencies and BW

| Zone | Number of nodes in the Zone | Carrier frequency | Number of nodes supporting particular frequency | Minimum cell BW in zone on particular frequency | UE band capability | UE serving carrier frequency | Selected frequency for inter-frequency |
|---|---|---|---|---|---|---|---|
| A | 30 | F1 | 30 | 10 | UE-1: B1, B4, B5 | F1 | F5 |
|   |    | F2 | 30 | 5  |   |   |   |
|   |    | F3 | 25 | 10 |   |   |   |
|   |    | F4 | 25 | 5  |   |   |   |
|   |    | F5 | 20 | 20 |   |   |   |
| B | 50 | F1 | 50 | 10 | UE-2: B2, B5, B7 | F2 | F5 |
|   |    | F2 | 50 | 5  |   |   |   |
|   |    | F3 | 45 | 10 |   |   |   |
|   |    | F5 | 40 | 10 |   |   |   |
|   |    | F6 | 50 | 20 |   |   |   |
|   |    | F7 | 45 | 5  |   |   |   |
| C | 35 | F2 | 30 | 3  | UE-3: B1, B2, B3, B7 | F3 | F7 |
|   |    | F3 | 35 | 10 |   |   |   |
|   |    | F4 | 35 | 5  |   |   |   |
|   |    | F6 | 25 | 20 |   |   |   |
|   |    | F7 | 20 | 10 |   |   |   |

In some embodiments, the selection may be based on the common supported frequencies with the largest bandwidths or bandwidths in a certain range. This embodiment is similar to the previous embodiment but in addition the positioning node 1005 also takes into account the bandwidth of the cells in a carrier for selecting the most appropriate carrier for inter-frequency positioning measurements. The rationale is that larger BW improves the measurement accuracy, which in turn leads to a better positioning accuracy. In this case the positioning node first identifies the carrier frequencies, which are most commonly supported by certain number of radio network nodes 101 in a coverage area or zone. The zones may overlap. A particular carrier may not be used in all zones for several reasons.

Using this principle the UE 103 is requested to perform inter-frequency positioning measurements on the frequency, which is also part of the UE capability, which is supported by most of the nodes in its zone or coverage area but also whose minimum BW in all the nodes is the largest or within a certain range, e.g. over 5 MHz, and another determining factor for deciding the frequency may be considered e.g. node type/class or the number of available cells on each frequency. This principle is illustrated by Table 2 below, assuming the same UE-1, UE-2 and UE-3 are located in zones A, B and C respectively. Furthermore, UE-1, UE-2 and UE-3 also support bands B1, B4 and B5, bands B2, B5 and B7, and bands B1, B2, B3 and B7, respectively. However based on the principle of this embodiment the selected inter-frequencies are different compared to those illustrated in table 1 above.

According to some embodiments the carrier frequency selection for the inter-frequency positioning measurements by the positioning node 1005 is based on static information, e.g. common frequency and BW as described above, and semi-static or configurable information, e.g. UL-DL sub-frames configuration in TDD or configured low-interference subframes e.g. according to a transmission pattern of a cell in a heterogeneous network. This means the positioning node 1005 should also acquire the currently configured TDD sub-frame configuration information, e.g. UL-DL sub-frame configuration, special sub-frame configuration as defined in 3GPP for E-UTRAN TDD, on each carrier frequency in the radio network nodes 101. The information may be acquired by any suitable means e.g. via the UE 103, directly from the radio network node 101, e.g. eNode B, relay node, from the core network node, e.g. MME, or O&M.

The principle of selecting a carrier frequency for the inter-frequency positioning measurements is illustrated in Table 3 below. In E-UTRAN TDD the measurement requirements and in particular the measurement accuracy of the inter-frequency positioning measurements is affected by the cell or PRS bandwidth and the number of available downlink sub-frames in a half frame, i.e. in 5 ms in LTE TDD. There is a tradeoff between the number of available downlink sub-frames in a TDD half frame and the bandwidth of the cell or of the available PRS in a cell. Preferably a carrier with larger PRS bandwidth and larger number of DL sub-frames in a half frame should be selected. This is because the availability of the total number of resource elements containing the PRS is maximized. If it is not possible to have both larger PRS BW and larger number of DL sub-frames in a half frame then a cell with either larger BW or with larger number of DL-sub-frames should be selected for inter-frequency positioning measurements.

In order to select the carrier frequency for the inter-frequency positioning measurements the positioning node 1005 uses the principle, which is similar to the one described by Table 3 above, but in addition at least one set of radio related dynamic information. For example the positioning node 1005

TABLE 3

Principle for selecting the frequency for inter-frequency measurements based on principle of static and semi-static information

| Zone | Number of nodes in the Zone | Carrier frequency | Number of nodes supporting particular frequency | Minimum cell BW in zone on particular frequency | UE band capability | UE serving carrier frequency | UL-DL sub-frame configuration in TDD | Selected frequency for inter-frequency |
|---|---|---|---|---|---|---|---|---|
| A | 30 | F1 | 30 | 10 | UE-1: B1, B4, B5 | F1 | 2 DL sub-frame/5 ms | F4 |
|   |    | F2 | 30 | 5  |   |    | 1 DL sub-frame/5 ms |    |
|   |    | F3 | 25 | 10 |   |    | 1 DL sub-frame/5 ms |    |
|   |    | F4 | 25 | 5  |   |    | 3 DL sub-frame/5 ms |    |
|   |    | F5 | 20 | 20 |   |    | 1 DL sub-frame/5 ms |    |
| B | 50 | F1 | 50 | 10 | UE-2: B2, B5, B7 | F2 | 1 DL sub-frame/5 ms | F7 |
|   |    | F2 | 50 | 5  |   |    | 2 DL sub-frame/5 ms |    |
|   |    | F3 | 45 | 10 |   |    | 1 DL sub-frame/5 ms |    |
|   |    | F5 | 40 | 10 |   |    | 1 DL sub-frame/5 ms |    |
|   |    | F6 | 50 | 20 |   |    | 2 DL sub-frame/5 ms |    |
|   |    | F7 | 45 | 5  |   |    | 3 DL sub-frame/5 ms |    |
| C | 35 | F2 | 30 | 3  | UE-3: B1, B2, B3, B7 | F3 | 2 DL sub-frame/5 ms | F7 |
|   |    | F3 | 35 | 10 |   |    | 2 DL sub-frame/5 ms |    |
|   |    | F4 | 35 | 5  |   |    | 1 DL sub-frame/5 ms |    |
|   |    | F6 | 25 | 20 |   |    | 1 DL sub-frame/5 ms |    |
|   |    | F7 | 20 | 10 |   |    | 1 DL sub-frame/5 ms |    |

According to some embodiment the inter-frequency selection by the positioning node 1005 is based on static information, e.g. common frequency and BW as in above-described embodiments, semi-static or configurable information, e.g. UL-DL sub-frames configuration in TDD, whenever applicable and dynamic information such as cell load, received interference, radio resource usage or radio channel usage, configured low-interference subframes, e.g. according to a transmission pattern of a cell in a heterogeneous network, serving cell type, e.g. pico or macro cell, etc. In summary the dynamic information depicts the radio condition and/or radio resource status of the cells operating on certain carrier frequency.

The examples of the cell load and the radio resource usage/radio channel usage comprise of the mean transmit power and resource block usage respectively. Examples of received interference measurement are the signal quality measurement, total interference measurement performed by the UE 103 or by the target device 1003 which is also expected to carry out the inter-frequency positioning measurements.

The dynamic information as described above may be acquired by the positioning node 1005 from the UE 103 or the target device 1003, radio network node 101, the core network node, e.g. MME, or O&M.

may select a carrier frequency which is most readily available in the network, i.e. in most sites, has larger BW in most nodes, has maximum possible DL sub-frames per frame of half-frame, e.g. in case of TDD, and in addition with lowest possible cell load in most cells.

The rules described above may also be used for selecting inter-frequencies when configuring inter-frequency measurements and building up assistance data for inter-frequency measurements. Additionally, the following two rules may also be used for the same purpose. The selection may account for the measurement quality statistics, e.g. collected RSTD quality information. Furthermore, the zones may be associated with fingerprinting maps or AECID maps to enhance frequency selection.

Any of the disclosed rules are particularly useful in a multi-frequency and/or multi-RAT network, given that the number of frequencies on which the UE 103 may measure on and the number of frequencies which may be signaled in the assistance data are limited compared to the number of frequencies used in the network 100.

An inter-frequency-RSTD measurement is a measurement when the reference cell and/or the neighbor cell belong to the frequency, which is different than the serving cell carrier frequency.

Furthermore, RSTD measurement requirements depend on the reference signal periodicity, e.g. PRS periodicity, when the measurements are performed on PRS, and even if the periodicity may be the same on the same carrier in all cells, is more likely that it is different on different carriers. The current requirements in the 3GPP standard do not take into account the possibly of configuring PRS periodicity, and hence the terminal measurement, different in different cells, neither for inter-frequency nor for intra-frequency. In some embodiments, the requirements are specified with respect to the largest PRS periodicity for cells in the list, both for intra- and inter-frequency. Furthermore, this aspect is taken into account configuring PRS periodicity in the different cells, i.e. with different PRS periodicities one should expect that the requirements will be specified for the worst case.

In some embodiments, the selection may account for the measurement quality statistics. Together with measurements, the measuring node may also report, to the positioning node 1005, the quality of the measurements, e.g. RSTD quality has to be reported together with RSTD for each neighbor cell. Statistics on the measurement quality may thus be collected, e.g. by the positioning node, which then may be utilized when deciding inter-frequencies when configuring measurements or building up the assistance data.

For example, only cells in which a certain statistical indicator, e.g. fifth percentile or mean, of the inter-frequency quality measures meet a certain level for the measurement in question, e.g. RSTD or time of arrival, are taken into account. In one embodiment, the acceptable level of the quality measure depends on the requested positioning Quality of Service (QoS).

In some embodiments, the zones may be associated with fingerprinting maps or AECID maps. The positioning node 1005 may use statistics on frequency-related information which is either collected by the positioning node 1005 or some other node(s) in the network 100. A map of zones and the associated statistics may be created and maintained in a semi-static or dynamic manner. The zones may be further associated with fingerprinting maps or AECID maps, so that for each zone a corresponding area from the fingerprinting map or AECID map may be derived, which may be used to further facilitate the decision on selecting the set of frequencies for inter-frequency measurements since e.g. AECID maps may, for example, give also the signal strength and signal quality information.

In some embodiments, TDD configuration information may be acquired and utilized for enhancing positioning measurements. The duplex mode information may be obtained by the virtue of the EARFCN information, which according to some embodiments is acquired by the positioning node 1005 by different possible means e.g. by the UE 103, by the radio network node 101, by the core network, or by O&M. However there still may be different configurations of TDD cells, e.g. different uplink-downlink configurations which define the applicability of the RSTD requirements and impact the positioning measurement accuracy in general. For example according to 3GPP the RSTD measurement requirements are applicable for all 7 possible uplink-downlink configurations, defined in 3GPP, only when the PRS bandwidth is 50 RBs or larger.

Also, the uplink-downlink TDD configurations which are not applicable or are less preferable for positioning measurements on downlink signals may be well-suited for performing uplink positioning measurements. When the uplink-downlink configurations for the respective cells are known to the positioning node 1005, the information may be utilized e.g. for building up the assistance data for DL measurements and prioritizing cells configured to have more downlink sub-frames.

The uplink-downlink configuration of the serving cell may also be used when building up the list of cooperating LMUs 104 and configuring the LMUs 104 for uplink measurements.

The TDD configuration information such as the uplink-downlink configuration and special sub-frame configuration or simply the number of available DL, for DL measurements, and UL, for UL measurements, sub-frames in a frame may be acquired similar to the ways described for acquiring frequency-related information. E.g., the TDD configuration information may be obtained via the UE 103, or obtained directly from radio network node 101 to which the information relates. In some embodiments, the TDD configuration information may be obtained via a core network node, or obtained via an O&M node.

It is further assumed that in case the information is used for enhancing uplink measurements, the uplink-downlink configuration information may be further signaled to LMUs 104 over a standardized or a proprietary interface.

In some embodiments, the duplex information may be acquired and utilized for enhancing positioning measurements.

In addition to the information about the FDD and TDD modes which may be obtained from the channel/band information, the explicit duplex information, referred to as radio network node duplex-related information, may still be needed when half duplex may be used in the system.

Since the carrier frequency number, e.g. EARFCN, is unique, by knowing this it is possible to determine the frequency band, which is either FDD or TDD. However, it may be more difficult to find difference between full FDD and HD-FDD without explicit information. Same FDD band may be used as full or HD-FDD. The usage is up to the radio network node 101 and the available UE 103 or target device duplex capability. For example, certain target devices or UEs 103 may only be half duplex capable for certain bands whereas others may support full duplex for the same band. The positioning node 1005 is currently not aware of the duplex mode of the cell i.e. whether a cell is an FDD, half duplex FDD (HD-FDD) or TDD cell. In some embodiments, there may be a mix of them in the network 100.

Also, the UE 103 needs to know the duplex mode of the cell, i.e. whether a cell is FDD, HD-FDD or TDD, e.g. in order to correctly apply the PRS configuration defined in 3GPP, which specifies the number of consecutive DL subframes available for positioning measurements. Only the DL subframes are counted. Furthermore in case of half duplex FDD operation in a frequency band, e.g. FDD band X, the DL sub-frames available for the positioning measurements in a positioning occasion may be sparse compared to the DL-frames available in the same band, i.e. band X, when operating as the full FDD duplex.

In some embodiments, the positioning node 1005 is enabled to acquire the duplex information of a particular band. This information in turn will allow the positioning node 1005 to select the carrier frequency which is most suitable for the inter-frequency measurements. The frequency band duplex information of the duplex mode used in the radio network node 101 for each carrier frequency, i.e. whether the carrier is FDD, TDD or half duplex FDD or even information such as duplex distance in case of variable duplex, may be acquired by the positioning node 1005 in a way very similar to that described for acquiring frequency-related information in earlier sections. E.g. the duplex information may be obtained via the UE 103, or obtained directly from radio network node 101 to which the information relates. In some embodiments, the duplex information may be obtained via a core network node, or obtained via an O&M node.

It is further assumed that the duplex-related information may also be signaled to LMUs 104 over a standardized or a proprietary interface e.g. from the positioning node 1005 or from the radio network node 101.

In another embodiment, the duplex information, e.g. full of half duplex mode and/or the number of DL or UL subframes per time interval e.g. per frame, is acquired by the terminal 103 e.g. from the positioning node 1005 e.g. via LPP, which may include the duplex information into the assistance data for at least some cells in the cell list. Alternatively, an indicator may be included in the assistance data, per cell or for all cells, to indicate whether the duplex configuration is the same as in the serving cell or is the same as the reference cell.

For the same frequency band, e.g. 3.5 GHz which is being standardized, some UEs 103 may support full duplex FDD operation and some UEs 103 may support half duplex FDD. It is though less likely however still possible that there are UEs 103 supporting both full duplex and half duplex operation in the same frequency band. According to some embodiments the positioning node 1005 may also acquire the UE duplex capability or currently used duplex mode, in case it supports half and full duplex for the same band, from the UE 103 or from any other suitable first node 1001 in case they have this information. This information may be referred to as terminal duplex-related information. The other nodes include the radio network node 101, e.g. radio network controller, eNode B, base station etc., or the core network node, e.g. MME, or O&M.

The positioning node 1005 uses the UE 103 and/or radio network node 101 duplex capability or currently used duplex mode for the carrier frequencies in order to select the most appropriate carrier frequency for the inter-frequency positioning measurements. For example the positioning node 1005 may select a carrier frequency with half duplex FDD in case the BW of the PRS is large. This is because typically there may be fewer than normal number of DL sub-frames available for the positioning measurements when the carrier is configured or used as half duplex FDD.

Furthermore the positioning node 1005 may also acquire the information related to the currently used DL sub-frames in a frame or half frame or in any time period in a radio network node for a particular half duplex FDD band. It may also acquire the information related to the UL sub-frames currently used in a time period for UL positioning measurements e.g. for eNode B Rx-Tx time difference measurement, angle of arrival measurement etc., which are used for enhanced cell ID positioning method, or measurements used for UTDOA.

Half-Duplex Pre-defined Configuration for Applicability of Positioning Measurements According to some embodiments, for the half duplex FDD frequency bands, the downlink sub-frame configuration(s) for which the positioning measurement requirements, e.g. OTDOA RSTD measurement requirements such as RSTD measurement reporting delay, RSTD measurement accuracy etc., are applicable, shall be pre-defined. This stems from the fact that in case of half duplex FDD operation in a frequency band, e.g. FDD band X, the number of DL sub-frames available for the positioning measurements in a positioning occasion may be lower than the number of DL-frames available in the same band, i.e. band X, when operating as the full FDD duplex.

The DL configuration may be expressed in terms of number of DL-frames or consecutive DL sub-frames available for the positioning measurements e.g. those containing positioning reference signals.

Furthermore separate configurations for the applicability of the positioning measurements may be defined for intra-frequency positioning measurements and inter-frequency measurements.

For example in case of intra-frequency measurements the minimum number of the DL sub-frames required for the applicability of the requirements may be lower than compared to those required for the inter-frequency measurements. The rationale is that the inter-frequency measurements are carried out in measurement gaps and as a consequence few sub-frames, e.g. 1-2 DL sub-frames, may not be usable.

The above pre-determined rules shall be used by the UE 103 to meet the positioning measurement requirements when performing a specific type of measurements e.g. intra-frequency or inter-frequency positioning measurements. This means the UE 103 or the target device shall store the pre-determined DL configurations for the half duplex FDD frequency band in case the UE 103 or the target device supports this particular band.

For E-UTRAN, the DL sub-frame configurations, for which the positioning measurement requirements shall apply for the half duplex FDD bands, e.g. 3.5 GHz, shall be defined in 3GPP, which currently contains the positioning measurement requirements for FDD bands, while assuming only full duplex. This is explained below.

In E-UTRAN full duplex FDD operation, e.g. full duplex operation of FDD band X, the eNode B 101 may transmit in all the 10 DL sub-frames in each 10 ms frame. In E-UTRAN during a positioning occasion the PRS may be transmitted in up to 6 downlink sub-frames. Now consider that eNode B 101 operates the same FDD band X, or any other FDD band Y, in half duplex mode or assume that FDD band X is only possible to be operable in half FDD duplex mode. It needs to be specified or pre-defined that the positioning measurement requirements, e.g. RSTD reporting delay, RSTD measurement accuracy etc for E-UTRAN OTDOA, under different scenarios such as intra-frequency, inter-frequency or even inter-RAT, e.g. in multi-RAT carrier aggregation, shall apply provided the frequency band(s) under half duplex FDD operation shall provide at least K number of DL sub-frames carrying the PRS in a positioning occasion. Further assume that as an example K=4, which may be the same for all or for specific band operating in the half duplex mode. This means during a 10 ms frame if the eNode B 101 transmits L DL sub-frames, where L<K=4 DL sub-frames, such that L DL-frames containing the PRS lie in one positioning occasion, then the UE 103 would not be required to meet the positioning measurement requirements. The UE 103 shall use the pre-determined configuration for each half duplex FDD band to determine whether it is allowed to meet the requirements or not. It may also be possible that some of the measurement requirements are still met provided the PRS transmission BW is larger than a threshold. This is because the time domain integration, i.e. determined by the number of available DL sub-frames comprising the PRS in a positioning occasion, may be traded with the frequency integration, i.e. determined by PRS transmission BW. Hence similar RSTD accuracy is possible to achieve with larger number of DL sub-frames and smaller BW or vice versa. In the above example for the given half duplex FDD band where only 2 DL frames are made available in a positioning occasion by the eNode B 101, the UE 103 may meet the RSTD accuracy requirements provided the PRS transmission BW is at least 25 RBs, i.e. 5 MHz or larger. This means under smaller PRS BW, the UE 103 is not required to meet the RSTD measurement requirements. These rules, i.e. tradeoff between required PRS BW and DL sub-frames, may be pre-defined.

In addition to the DL sub-frame configuration, the UL sub-frame configuration may also be defined or even a configuration covering DL and UL sub-frames used in half duplex FDD band in a radio network node 101 may also be defined for the applicability of the positioning measurement requirements. For example the UL sub-frame configuration for which the UL positioning measurements such as the round trip time, propagation delay, base station Rx-Tx time difference measurement, angle of arrival etc, are applicable shall also be pre-defined. In some cases the pre-defined configuration should cover both UL and DL sub-frames in a time period e.g. in a frame or in a half frame.

It may also be that for the same frequency band UE 103 have different set of half duplex capabilities. For example certain UEs 103, set of UEs-A, supporting half duplex band X shall be capable of receiving X1, e.g. X1=5, number of sub-frames in a frame. Another set of UEs 103, set of UEs-B, also supporting half duplex band X shall be capable of receiving only X2, e.g. X2=3, number of sub-frames in a frame. To cater for these variant of UEs, additional rules associated with the half and full duplex FDD modes of the operation for the same band may also be specified. For example it may be pre-defined that the UE 103 which is capable of half duplex mode set A shall meet the positioning measurement requirements when PRS BW is above certain threshold e.g. 25 RBs, provided at least X1 DL sub-frames containing the PRS are available in a positioning occasion. Furthermore, it may be pre-defined that the UE 103 which is capable of half duplex mode set B shall meet the positioning measurement requirements when PRS BW is above certain threshold e.g. 50 RBs, provided at least X2 DL sub-frames containing the PRS are available in a positioning occasion.

The thresholds in terms of number of required DL sub-frames and/or PRS BW may be different for intra-frequency, inter-frequency and inter-RAT positioning measurement requirements.

According to some embodiments, which is an extension of the embodiments for positioning measurements, the UE 103 is also required to meet the measurement requirements for one or more non-positioning related measurements provided at least the pre-defined number or set of sub-frames, e.g. number of DL, UL or both DL-UL sub-frames in a frame or in a time period, in a time period associated with a half duplex FDD band are available for performing these measurements. The applicability condition may also include pre-defining different number of required sub-frames for different transmission BW of the cell in case of DL or of UE in case of UL or both DL and UL in case the measurement comprises of measuring signals on both UL and DL, e.g. round trip time.

Furthermore the applicability condition may also apply for the base station measurements i.e. those which are done on the uplink by the base station (BS) 101 over the signals received from the UE 103. The applicability condition implies that the BS 101 shall meet the measurement requirements of the BS measurements for the HD-FDD band provided certain minimum number of sub-frames are sent by the UE 103 in the UL over a period of time e.g. over a frame. Examples of such measurements are UL received power, UL propagation delay etc.

Examples of non-positioning measurements are neighbor cell measurements e.g. E-UTRAN UE measurements such as RSRP or RSRQ. Another set of examples is that of inter-RAT measurements such as UTRAN CPICH RSCP or CPICH Ec/No etc. Yet other examples of non-positioning measurements are those performed for self organizing network (SON), minimization of drive tests, network planning, operation and maintenance purposes, measurements done on the paging channel, broadcast channel etc.

The embodiments disclosed above may be further generalized to a general subframe configuration where X subframes, e.g. per frame, are available for measurements e.g. positioning measurements. The X subframes available for positioning measurements may account for any combination of e.g. duplex mode and related subframe configuration, subframes configured for measurements in heterogeneous deployments and configured low-interference subframes, etc.

In previous sections the embodiments are described for single carrier operation. However, all embodiments are also applicable for any type of multi-carrier or carrier aggregation system e.g. intra-RAT multi-carrier such as LTE CA or inter-RAT CA such as WCDMA-LTE multi-carrier. In case of multi-carrier system the positioning node 1005 will acquire all necessary information enabling it to determine the most appropriate carrier frequency for the inter-frequency measurements.

For example the positioning node 1005 may acquire one or more of the following pieces of information for each or for all necessary component carriers used in the multi-carrier system but not limited to:

Information related to the frequencies, e.g. a plurality of EARFNC or channel numbers, and RATs;
TDD configuration, e.g. UL-DL configuration, special subframe configuration, etc;
Cell BW;
PRS BW;
Dynamic information such as cell load, radio resource usage, measured interference, etc.;
Duplex mode of operation etc.;
Currently used number of subframes in a certain direction, e.g. DL or UL, depending on measurements in question, in a frame or in a period or configured pattern or just the number of low-interference subframes e.g. a transmission pattern of a cell in a heterogeneous network, etc.

As in earlier embodiments the above information may be acquired via the terminal 103, radio network node 101, e.g. eNode B, RNC, relay node which may be fixed or mobile relay, from the core network node, e.g. MME, or O&M.

Figure 3:
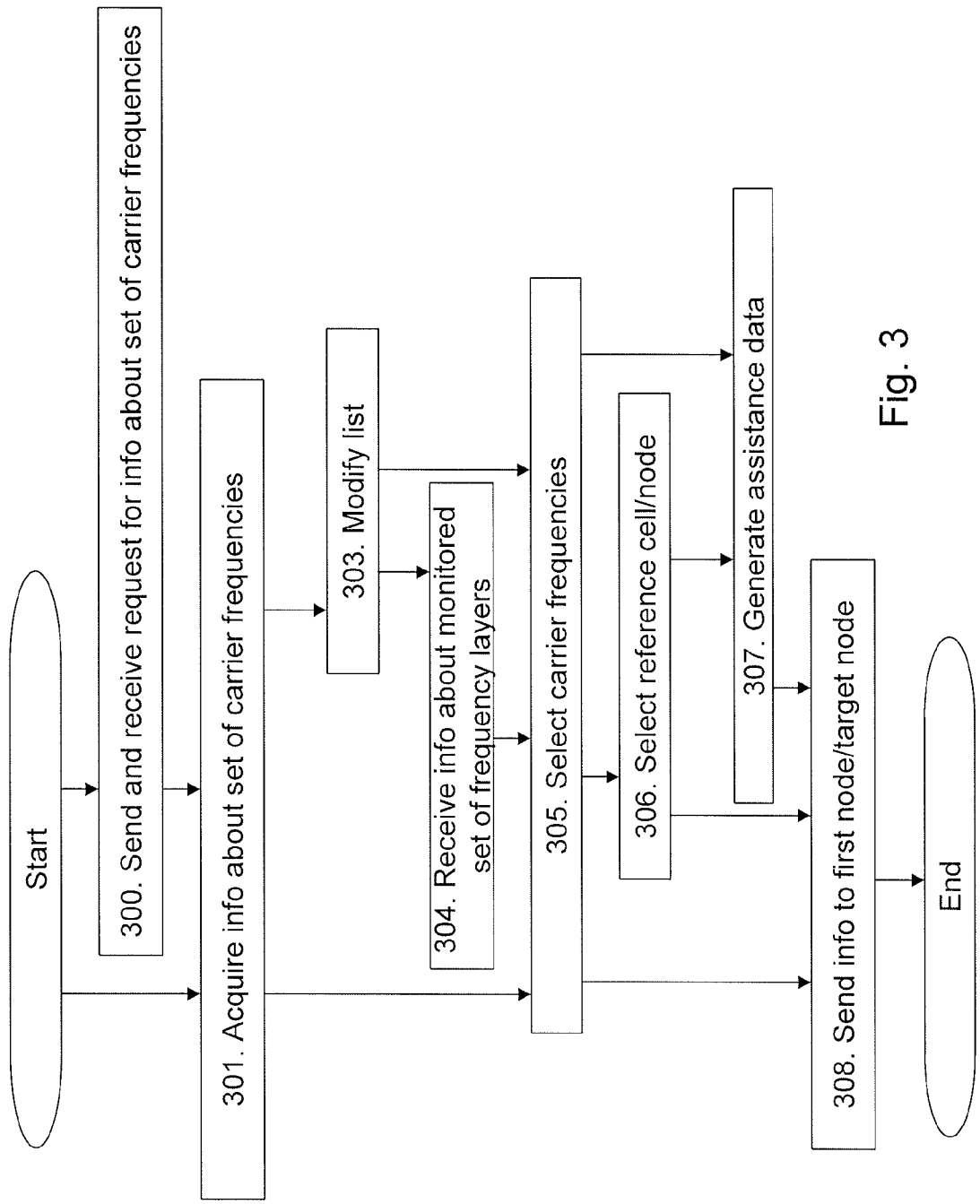
FIG. 3 is a signaling diagram illustrating embodiments of a method in a positioning node.

The method described above will now be described seen from the perspective of the positioning node 1005. FIG. 3 is a flowchart describing the present method in the positioning node 1005 for handling measurements in a communications network 1000. In some embodiments, the communications system 1000 is a multi-carrier communications system or a carrier aggregation communications system. In some embodiments, the target node 1003 is any of a user equipment 103, a location measuring unit, referred to as a LMU 104, a relay, a beacon device, a terminal 103, a laptop, a small radio base station. In some embodiments, the first node 1001 is a user equipment 103, a radio network node 101, a radio base station 101 or an LMU 104. The method comprises the further steps to be performed by the positioning node 1005:

Step 300

This step corresponds to steps 201, 202, 203 and 204 in FIG. 2.

In some embodiments, the positioning node 1005 sends, to the first node 1001 a request for the information about the set of carrier frequencies.

In some embodiments, the positioning node 1005 receives, from the first node 1001, the requested information about the set of carrier frequencies.

Step 301

This step corresponds to steps 201, 202, 203 and 204 in FIG. 2.

The positioning node 1005 acquires information about a set of carrier frequencies. The information comprises information about at least a channel number and a bandwidth for each respective carrier frequency in the set.

In some embodiments, the acquired information is comprised in information about configuration or capability of at least one of the first node 1001 and the target node 1003.

In some embodiments, the positioning node 1005 acquires information related to a duplex capability of the first node 1001 and the target node 1003.

In some embodiments, the positioning node 1005 acquires information related to subframe configuration.

In some embodiments, the acquired information comprises information about a duplex mode, which information about duplex mode is one of information about a selected carrier frequency being comprised in a half duplex frequency division duplex, referred to as HD-FDD, mode, FDD mode or time division duplex mode, referred to as TDD mode.

In some embodiments, the information further comprises information about at least one of a frequency band, a number of consecutive downlink subframes available for performing positioning measurements on a carrier with half duplex frequency-division duplex mode, referred to as HD-FDD mode, of operation, a number of consecutive subframes with downlink position reference signals, referred to as DL PRS, available for performing positioning measurements for carrier operating using HD-FDD mode, information about duplex distance related to variable duplex, information that neighbour cells and a serving cell have a same HD-FDD duplex configuration, frequency band number associated with a supported carrier frequency, information about radio access technology, information about a set of frequencies associated with positioning, subframe configuration information, information about uplink-downlink subframe configuration, a serving cell, a donor eNB, an associated cell and information about positioning capabilities of the target node 1003.

In some embodiments, the subframe configuration information comprises at least one of information related to time-division duplex, referred to as TDD, information related to positioning reference signal, referred to as PRS, configuration, information related to transmit or measurement subframe configuration, information related to frequency-division duplex, referred to as FDD, mode, and half duplex mode FDD, referred to as HD-FDD.

In some embodiments, the HD-FDD duplex configuration information comprises at least one of a number of downlink subframes available in a cell, a number of downlink subframes available in a cell for measurements, a number of downlink subframes available in a cell for positioning measurements and a number of consecutive downlink positioning subframes available in a cell for positioning measurements.

In some embodiments, the information is acquired from the target node 1003, the first node 1001, a core network node or an operation and management, referred to as O&M, node.

In some embodiments, the positioning node 1005 may receive this information passively, e.g., periodically without sending an explicit request.

Step 303

This step corresponds to step 206 in FIG. 2.

In some embodiments, the positioning node 1005 selects a subset from the set of carrier frequencies when a number of carrier frequencies in the set exceed a number. In some embodiments, the number may be a predetermined limit or threshold.

Step 304

In some embodiments, the positioning node 1005 receives information about a monitored set of carrier frequency layers from a measuring node (not shown). The measuring node may be the target node 1003 or the first node 1001.

Step 305

This step corresponds to step 207 in FIG. 2.

The positioning node 1005 selects at least one carrier frequency based on the acquired information.

In some embodiments, the positioning node 1005 selects at least one of at least one cell, at least one radio node or at least one carrier frequency from the set of carrier frequencies.

In some embodiments, the positioning node 1005 selects the carrier frequency further based on the received information about the monitored set of carrier frequency layers.

In some embodiments, the positioning node 1005 selects the carrier frequency further based on collected measurements or measurement quality or zone information of the communications network 1000. In some embodiments, the collected measurements may be radio signal strength.

For example, if there are 2 carrier frequencies, and both meet the criteria for selection based on static/dynamic information, then both carrier frequencies may be selected.

In some embodiments, the selected carrier frequency is the most suitable carrier.

In some embodiments, the selecting of the at least one carrier frequency is further based on the information about the duplex capability and/or the information about the subframe configuration.

In some embodiments, the positioning node 1005 selects the at least one carrier frequency which is determined to be supported by both the first node 1001 and the target node 1003.

In some embodiments, the positioning node 1005 selects the at least one carrier frequency which is determined to be used for at least a predetermined number of times by the first node 1001.

In some embodiments, the positioning node 1005 selects the at least one carrier frequency which is determined to have a predetermined bandwidth or being within a predetermined bandwidth range.

Step 306

This step corresponds to step 207 in FIG. 2.

In some embodiments, the positioning node 1005 selects a reference cell or a radio node based on the acquired information. The reference cell is operating on at least the selected carrier frequency, and the first node 1001 is a location measurement unit, referred to as LMU 104. In some embodiments, a cell operates on one frequency, but multiple cells may be on the same frequency. The at least one cell and the at least one radio node is associated with the selected carrier frequency.

Step 307

This step corresponds to step 208 in FIG. 2.

In some embodiments, the positioning node 1005 generates assistance data based on the selected carrier frequency. The assistance data assists in positioning measurements

Step 308

This step corresponds to steps 209 and 212 in FIG. 2.

The positioning node 1005 sends information about the selected at least one carrier frequency to the first node 1001 or the target node 1003. The information further comprises at least a channel number and a bandwidth for the selected carrier frequency. Thereby, enabling the first node 1001 to perform measurements for the target node 1003 using the selected carrier frequency.

In some embodiments, the positioning node 1005 sends the generated assistance data to the first node 1001 or the target node 1003.

In some embodiments the first node 1001 in may be an eNodeB 101, a LMU 104 an UE 103.

For UL measurements, note that even if the measurements are performed by radio node, the information may still be sent to the target device 1003, e.g., UE 103. This is to configure the UL transmissions on the selected frequency that are to be measured by the radio network node 101. For DL measurements, the selected frequency information may be transmitted to the radio node, which will transmit DL signals on the selected frequency, and to the target device 1003, e.g., UE, which will perform measurements.

For example, 2 carrier frequencies may be supported by the network, whilst more frequencies may be supported by UE 103. Based on this information the positioning node 1005 may apply different selection strategies. For example, max. 2 frequencies may be included in the assistance data unless the positioning node 1005 is informed about that the UE 103 is able to cope with more inter-frequencies.

Figure 4:
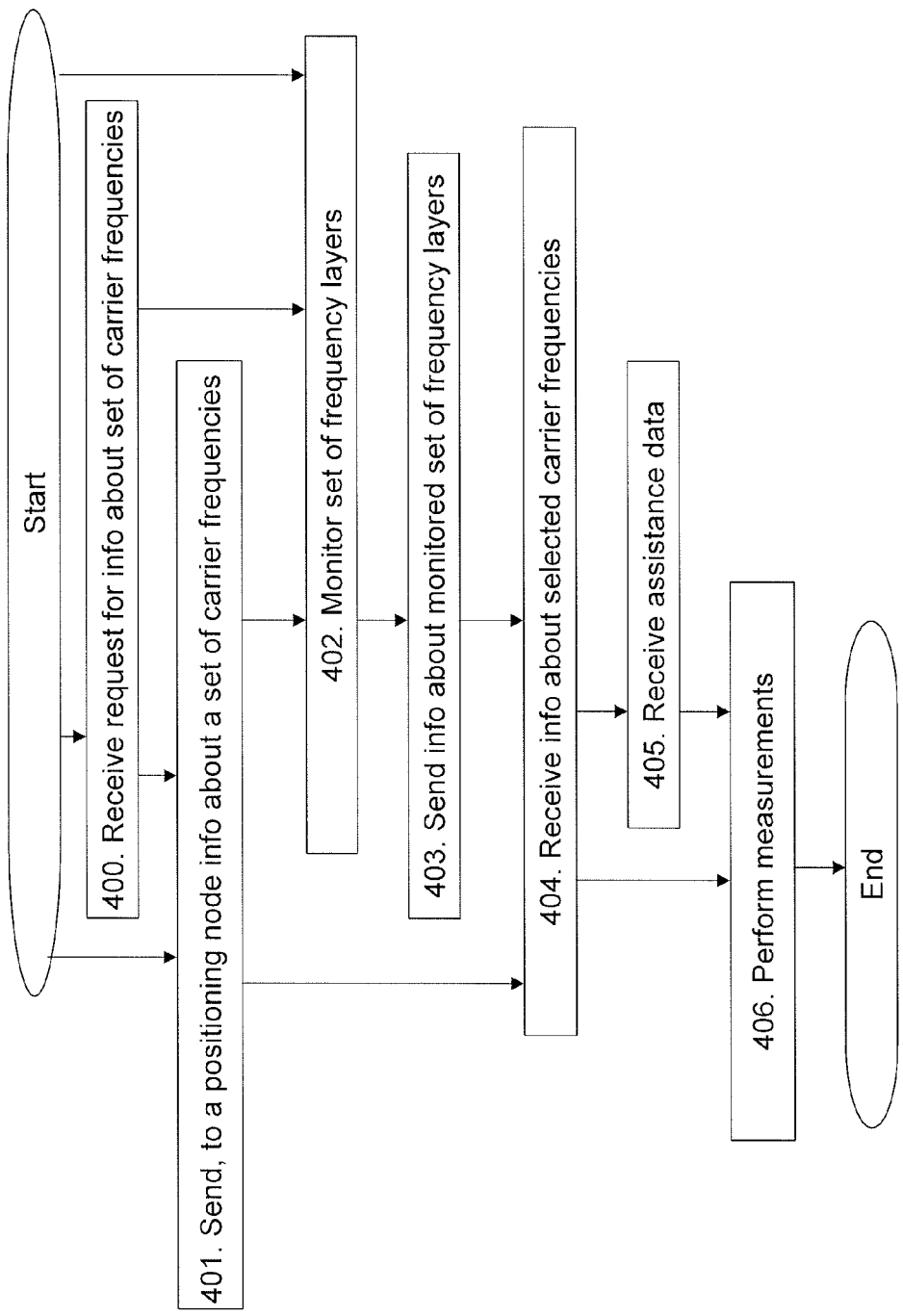
FIG. 4 is a flow chart illustrating embodiments of a method in a first node.

The method described above will now be described seen from the perspective of the first node. FIG. 4 is a flowchart describing the present method in the first node 1001 for handling measurements in the communications network 100. In some embodiments, the first node 1001 is a user equipment 103, a radio network node 101, a radio base station 101 or a location measuring unit 104, referred to as LMU. The method comprises the further steps to be performed by the first node 1001:

Step 400

This step corresponds to steps 201, 202, 203, 204 in FIG. 2.

In some embodiments, the first node 1001 receives, from the positioning node 1005 a request for the information about the set of carrier frequencies.

Step 401

This step corresponds to step 202 and 204 in FIG. 2.

The first node 1001 sends, to a positioning node 1005, information about a set of carrier frequencies. The information comprises at least a channel number for each of the respective carrier frequencies in the set of carrier frequencies and information about a bandwidth for each of the respective carrier frequencies in the set. The set of carrier frequencies comprises at least one carrier frequency.

In some embodiments, the sent information is comprised in information about configuration or capability of at least one of the first node 1001 and the target node 1003.

In some embodiments, the first node 1001 sends information related to a duplex capability of the first node 1001 and the target node 1003.

In some embodiments, the first node 1001 sends information related subframe configuration.

In some embodiments, the information about the set of carrier frequencies comprises information about a set of monitored carrier frequency layers.

In some embodiments, the information about the set of carrier frequencies comprises duplex mode information, which duplex mode information is one of information about half duplex frequency division duplex, referred to as HD-FDD mode, FDD mode or time division duplex mode, referred to as TDD mode.

In some embodiments, the information further comprises information about at least one of a frequency band, a number of consecutive downlink subframes available for performing positioning measurements on a carrier with half duplex frequency-division duplex mode, referred to as HD-FDD mode, of operation, a number of consecutive downlink position reference signals, referred to as DL PRS, subframes available for performing positioning measurements for carrier operating using HD-FDD mode, information about duplex distance related to variable duplex, information that neighbour cells and a serving cell have a same HD-FDD duplex configuration, frequency band number associated with a supported carrier frequency, information about radio access technology, information about a set of frequencies associated with positioning, subframe configuration information, information about uplink-downlink subframe configuration, a serving cell, a donor eNB, an associated cell and information about positioning capabilities of the target node 1003.

In some embodiments, the subframe configuration information comprises at least one of information related to time-division duplex, referred to as TDD, information related to positioning reference signal, referred to as PRS, configuration, information related to transmit or measurement subframe configuration, information related to frequency-division duplex, referred to as FDD, mode, TDD mode and half duplex mode FDD, referred to as HD-FDD.

In some embodiments, the HD-FDD duplex configuration information comprises at least one of a number of downlink subframes available in a cell, a number of downlink subframes available in a cell for measurements, a number of DL subframes available in a cell for positioning measurements and a number of consecutive downlink positioning subframes available in a cell for positioning measurements.

Step 402

In some embodiments, the first node 1001 monitors a set of frequency layers.

In some embodiments, this step is performed before steps 400 and 401.

Step 403

In some embodiments, the first node 1001 sends information about the monitored set of frequency layers to the positioning node 1005.

Step 404

This step corresponds to step 209 and 212 in FIG. 2.

In some embodiments, the first node 1001 receives information about a selected at least one carrier frequencies from the positioning node 1005. The information further comprises at least a channel number for the selected carrier frequency and a bandwidth for the selected carrier frequency.

In some embodiments, the selected at least one carrier is based on the information about the duplex capability and/or the information about the subframe configuration.

In some embodiments, the selected at least one carrier is a frequency which is determined to be supported by both the first node 1001 and the target node 1003, and/or which is determined to be used for at least a predetermined number of times by the first node 1001, and/or which is determined to have a predetermined bandwidth or being within a predetermined bandwidth range.

Step 405

This step corresponds to steps 209, 212 in FIG. 2.

In some embodiments, the first node 1001 receives assistance data from the positioning node 1005.

Step 406

This step corresponds to step 210 and 213 in FIG. 2.

In some embodiments, the first node 1001 performs at least one measurement for positioning of the target node 1003 using the received information.

In some embodiments, the first node 1001 performs inter-frequency or inter-radio access technology measurements using the received information.

In some embodiments, the measurement for positioning of the target node 1003 is required to meet a pre-determined requirement when at least a minimum number of subframes for positioning measurement are available in a period of time. For example, the minimum number of subframes may be 4 or 6, and a measurement period requirement may be: (M−1)*Tprs+delta, where M=32, Tprs=160 ms, delta=150 ms.

In some embodiments, the pre-determined requirement comprises at least one of a measurement accuracy associated with the acquired information, a measurement time associated with the acquired information and a measurement reporting delay associated with the acquired information.

In some embodiments, and the first node 1001 performs at least one measurement for positioning of the target node 1003 further based on the received assistance data.

Embodiments where it is not explicitly stated on whether measurements for positioning are performed on downlink (DL) or uplink (UL) signals or channels, should be assumed to be applicable for both cases, i.e. downlink and uplink measurements.

Figure 5:
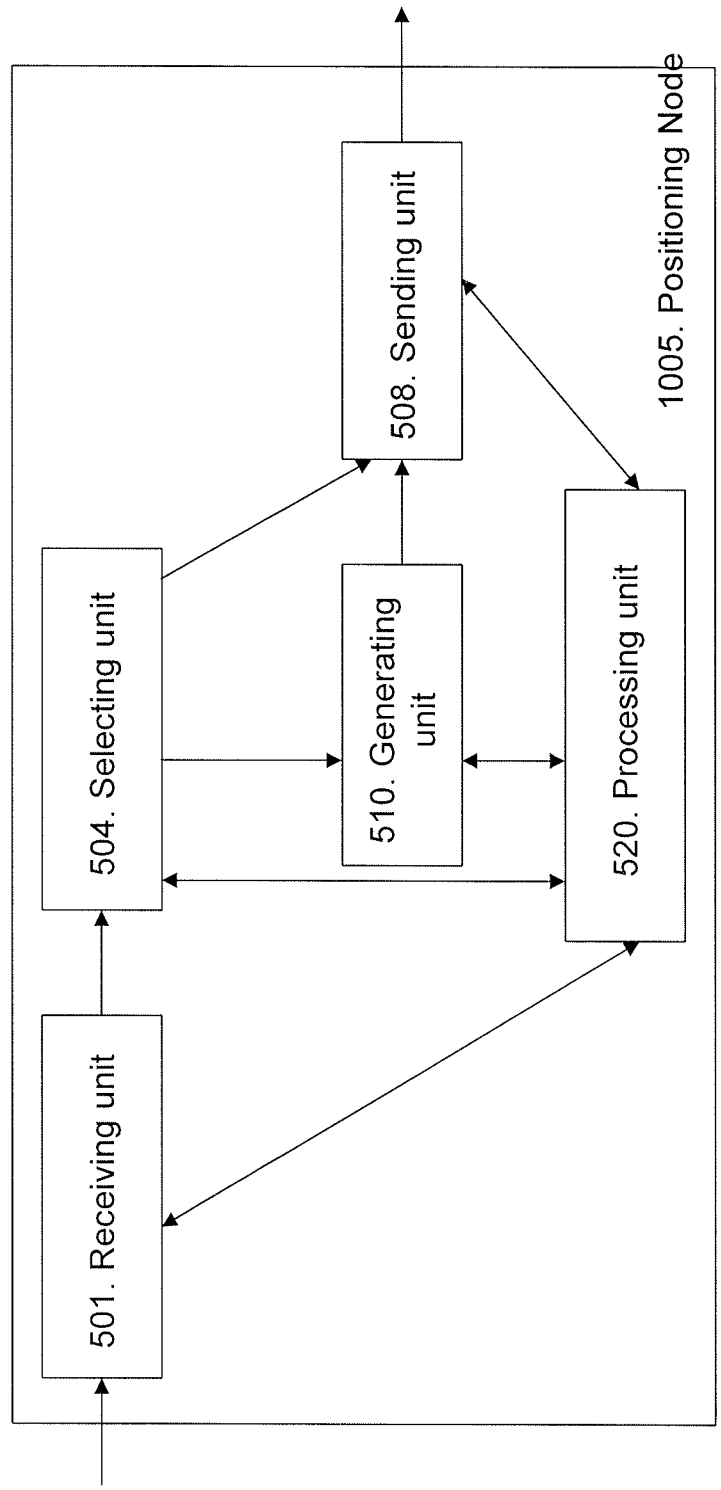
FIG. 5 is a schematic block illustrating embodiments of a positioning node.

To perform the method steps shown in FIG. 3 for handling measurements in a communications network 100 the positioning node 1005 comprises an arrangement as shown in FIG. 5. In some embodiments, the communications system 1000 is a multi-carrier communications system or a carrier aggregation communications system.

The positioning node 1005 comprises a receiving unit 501 configured to acquire information about a set of carrier frequencies. The information further comprises information about at least a channel number for each respective carrier frequency in the set and information about a bandwidth for each of the respective the carrier frequencies in the set. The set of carrier frequencies comprises at least one carrier frequency. In some embodiments, the acquired information is comprised in information about configuration or capability of at least one of the first node 1001 and the target node 1003. In some embodiments, the receiving unit 501 is further configured to acquire the information from the target node 1003, the first node 1001, a radio network node 101, a core network node or an operation and management, referred to as O&M, node.

In some embodiments, the receiving unit 501 is further configured to receive information related to a duplex capability of the first node 1001 and the target node 1003, and/or to receive information related subframe configuration.

In some embodiments, acquired information comprises information about a duplex mode, which information about duplex mode is one of information about a selected carrier frequency being comprised in a half duplex frequency division duplex, referred to as HD-FDD, mode, FDD mode or time division duplex mode, referred to as TDD mode.

In some embodiments, the information further comprises information about at least one of a frequency band, a number of consecutive downlink subframes available for performing positioning measurements on a carrier with half duplex frequency-division duplex mode, referred to as HD-FDD mode, of operation, a number of consecutive subframes with downlink position reference signals, referred to as DL PRS, available for performing positioning measurements for carrier operating using HD-FDD mode, information about duplex distance related to variable duplex, information that neighbour cells and a serving cell have a same HD-FDD duplex configuration, frequency band number associated with a supported carrier frequency, information about radio access technology, information about a set of frequencies associated with positioning, subframe configuration information, information about uplink-downlink subframe configuration, a serving cell, a donor eNB, an associated cell and information about positioning capabilities of the target node 1003.

In some embodiments, the subframe configuration information comprises at least one of information related to time-division duplex, referred to as TDD, information related to positioning reference signal, referred to as PRS, configuration, information related to transmit or measurement subframe configuration, information related to frequency-division duplex, referred to as FDD, mode, and half duplex mode FDD, referred to as HD-FDD.

In some embodiments, the HD-FDD duplex configuration information comprises at least one of a number of downlink subframes available in a cell, a number of downlink subframes available in a cell for measurements, a number of downlink subframes available in a cell for positioning measurements and a number of consecutive downlink positioning subframes available in a cell for positioning measurements.

In some embodiments, the receiving unit 501 is further configured to receive information about a monitored set of carrier frequency layers from a measuring node. The measuring node may be the target node 1003 or the first node 1001.

The positioning node 1005 comprises a selecting unit 504 configured to select at least one carrier frequency based on the acquired information. In some embodiments, the selecting unit 504 is further configured to, based on the acquired information, select a reference cell or a radio node. The reference cell is operating on at least the selected carrier frequency, and which radio node is a location measurement unit, referred to as LMU 104. In some embodiments, the selecting unit 504 is further configured to select a subset from the set of carrier frequencies when a number of carrier frequencies in the set exceeds a number, and to select at least one of at least one cell, at least one radio node or at least one carrier frequency from the set of carrier frequencies. In some embodiments, selecting unit 504 is further configured to select a carrier frequency further based on the received information about the monitored set of carrier frequency layers. In some embodiments, the selecting unit 504 is further configured to select the carrier frequencies based on the acquired information is further based on a maximum number of supported carrier frequencies, bandwidth, static information, semi-static information or dynamic information. In some embodiments, the semi-static information or dynamic information comprises at lest one of cell load, received interference and radio resource usage or radio channel usage. In some embodiments, the selecting unit 504 is further configured to select the carrier frequency based on the acquired information further based on collected measurements or measurement quality or zone information of the communications network 1000. In some embodiments, the selecting unit 504 is further configured to select the at least one carrier frequency is further based on the information about the duplex capability and/or the information about the subframe configuration.

In some embodiments, the selecting unit 504 is further configured to select the at least one carrier frequency which is determined to be supported by both the first node 1001 and the target node 1003.

In some embodiments, the selecting unit 504 is further configured to select the at least one carrier frequency which is determined to be used for at least a predetermined number of times by the first node 1001.

In some embodiments, the selecting unit 504 is further configured to select the at least one carrier frequency which is determined to have a predetermined bandwidth or being within a predetermined bandwidth range.

The positioning node 1005 comprises a sending unit 508 which is configured to send information about the selected at least one carrier frequency to the first node 1001 or the target node 1003. The information further comprises at least a channel number for the selected carrier frequency and a bandwidth for the selected carrier frequency, enabling the first node 1001 to perform measurements for the target node 1003 using the selected carrier frequency. In some embodiments, the sending unit 508 is further configured to send the generated assistance data to the first node 1001 or the target node 1003. In some embodiments, the sending unit 508 is further configured to send, to the first node 1001 a request for the information about the set of carrier frequencies.

In some embodiments, the positioning node 1005 comprises a generating unit 510 configured to generate assistance data based on the selected carrier frequency. The assistance data assists in positioning measurements.

Figure 6:
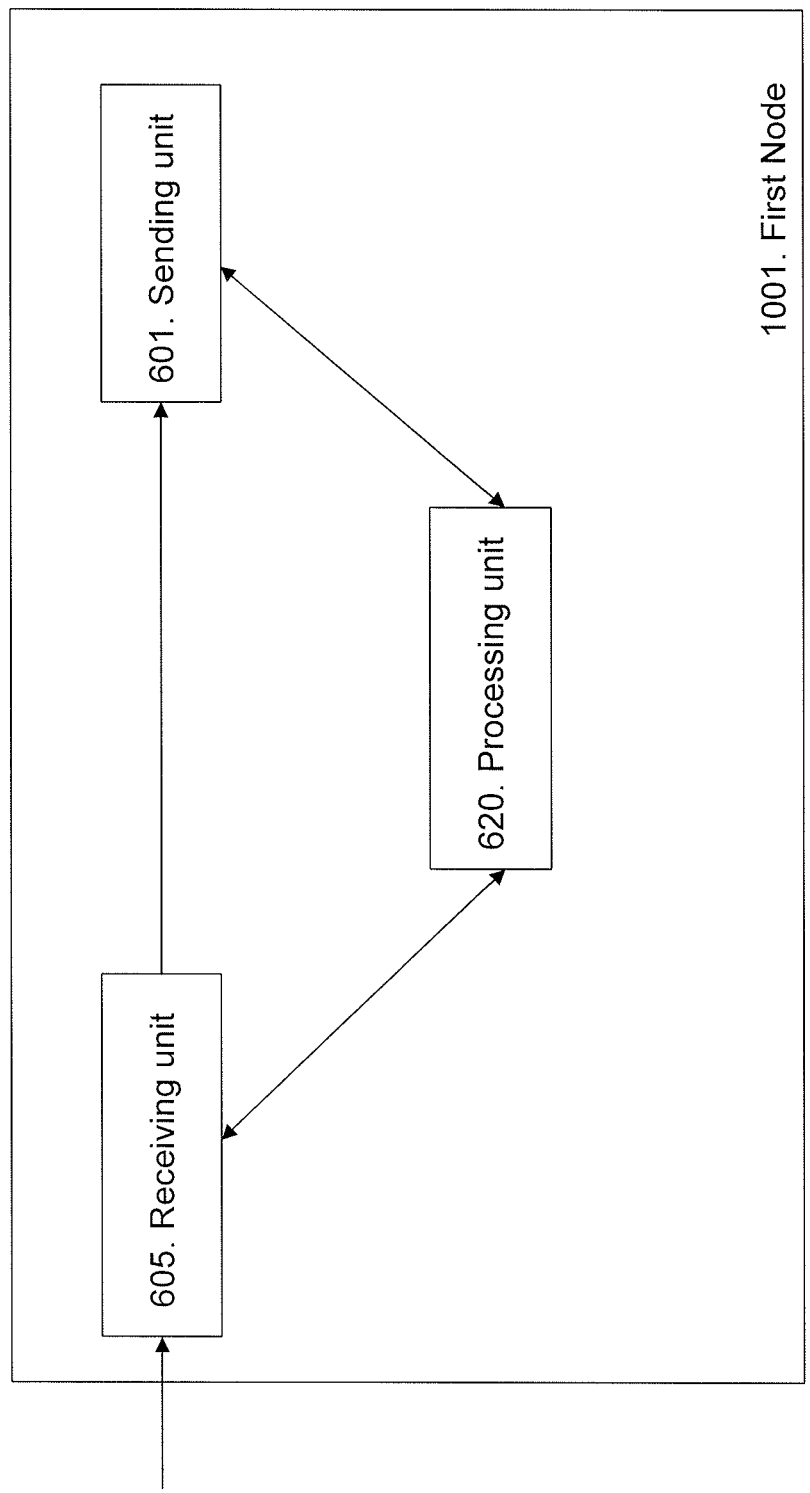
FIG. 6 is a schematic block diagram illustrating embodiments of a first node.

To perform the method steps shown in FIG. 3 for handling measurements in a communications network 100, the first node 1001 comprises an arrangement as shown in FIG. 6. In some embodiments, the first node 1001 is a user equipment 103, a radio network node 101, a radio base station 101 or a location measuring unit 104, referred to as LMU.

The first node 1001 comprises a sending unit 601 configured to send, to a positioning node 1005, information about a set of carrier frequencies. The information comprises at least a channel number and a bandwidth for each respective carrier frequencies in the set. The set of carrier frequencies comprises at least one carrier frequency. In some embodiments, the sent information is comprised in information about configuration or capability of at least one of the first node 1001 and the target node 1003. In some embodiments, the sending unit 601 is further configured to send information related to a duplex capability of the first node 1001 and the target node 1003, and/or to send information related subframe configuration.

In some embodiments, the information about the set of carrier frequencies comprises information about a set of monitored carrier frequency layers. In some embodiments, the information about the set of carrier frequencies comprises duplex mode information, which duplex mode information is one of information about half duplex frequency division duplex, referred to as HD-FDD mode, FDD mode or time division duplex mode, referred to as TDD mode.

In some embodiments, the information further comprises information about at least one of a frequency band, a number of consecutive downlink subframes available for performing positioning measurements on a carrier with half duplex frequency-division duplex mode, referred to as HD-FDD mode, of operation, a number of consecutive downlink position reference signals, referred to as DL PRS, subframes available for performing positioning measurements for carrier operating using HD-FDD mode, information about duplex distance related to variable duplex, information that neighbour cells and a serving cell have a same HD-FDD duplex configuration, frequency band number associated with a supported carrier frequency, information about radio access technology, information about a set of frequencies associated with positioning, subframe configuration information, information about uplink-downlink subframe configuration, a serving cell, a donor eNB, an associated cell and information about positioning capabilities of the target node 1003.

In some embodiments, the subframe configuration information comprises at least one of information related to time-division duplex, referred to as TDD, information related to positioning reference signal, referred to as PRS, configuration, information related to transmit or measurement subframe configuration, information related to frequency-division duplex, referred to as FDD, mode, TDD mode and half duplex mode FDD, referred to as HD-FDD.

In some embodiments, the HD-FDD duplex configuration information comprises at least one of a number of downlink subframes available in a cell, a number of downlink subframes available in a cell for measurements, a number of DL subframes available in a cell for positioning measurements and a number of consecutive downlink positioning subframes available in a cell for positioning measurements.

In some embodiments, the first node 1001 comprises a receiving unit 605 configured to receive information about a selected at least one carrier frequencies from the positioning node 1005. The information further comprises at least a channel number for the selected carrier frequency and a bandwidth for the selected carrier frequency. In some embodiments, the receiving unit 605 is further configured to receive, from the positioning node 1005, a request for the information about the set of carrier frequencies. In some embodiments, the receiving unit 605 is further configured to receive assistance data from the positioning node 1005. In some embodiments, the selected at least one carrier is based on the information about the duplex capability and/or the information about the subframe configuration. In some embodiments, the selected at least one carrier is a frequency which is determined to be supported by both the first node 1001 and the target node 1003, and/or which is determined to be used for at least a predetermined number of times by the first node 1001, and/or which is determined to have a predetermined bandwidth or being within a predetermined bandwidth range.

In some embodiments, the first node 1001 comprises a processing unit 620 configured to perform at least one measurement for positioning of the target node 1003 using the received information. In some embodiments, the processing unit 620 is further configured to perform inter-frequency or inter-radio access technology measurements using the received information. In some embodiments, the measurement for positioning of the target node 1003 is required to meet a pre-determined requirement when at least a minimum number of subframes for positioning measurement are available in a period of time. In some embodiments, the pre-determined requirement comprises at least one of a measurement accuracy associated with the acquired information, a measurement time associated with the acquired information and a measurement reporting delay associated with the acquired information. In some embodiments, the processing unit 620 is further configured to perform at least one measurement for positioning of the target node 1003 using the received information further based on the received assistance data.

The present mechanism for handling measurements in a communications network 1000 may be implemented through one or more processors, such as a processing unit 520 in the positioning node arrangement depicted in FIG. 5 and a processing unit 620 in the first node arrangement depicted in FIG. 6, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the positioning node 1005 and/or first node 1001. One such carrier may be in the form of a CD ROM disc. It is however feasible with other data carriers such as a memory stick. The computer program code may furthermore be provided as pure program code on a server and downloaded to the positioning node 1005 and/or first node 1001 remotely.

Figure 7:
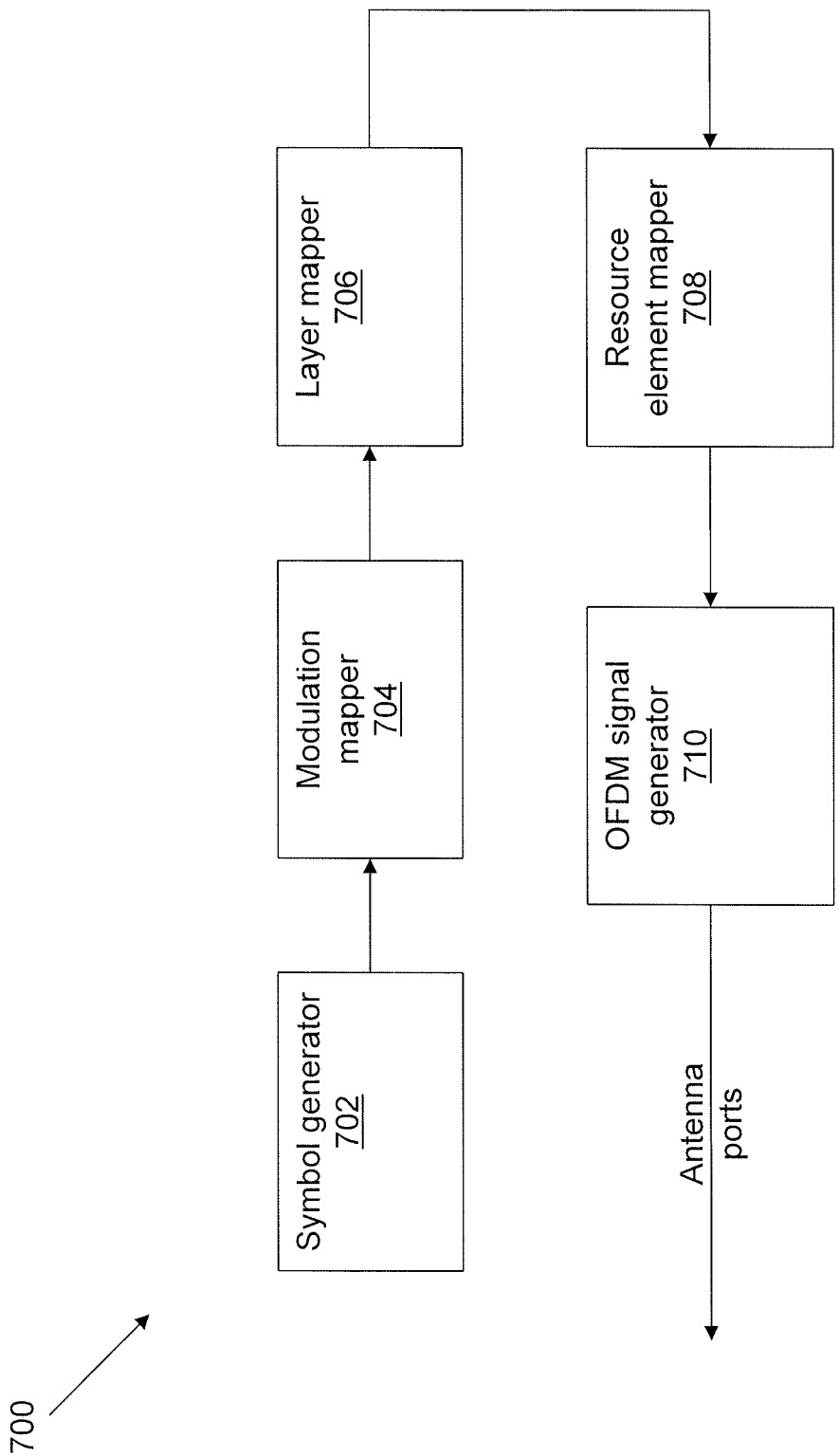
FIG. 7 is a schematic block diagram illustrating embodiments of a transmitter.

FIG. 7 is a block diagram of an example of a portion of transmitter 700 for a communication system 1000 that uses the reference signals described above. The transmitter 700 may refer to the base station 101 describe above, and is an example of a first node 1001. Reference signals having symbols as described above are produced by a suitable generator 702 and provided to a modulation mapper 704 that produces complex-valued modulation symbols. A layer mapper 706 maps the modulation symbols onto one or more transmission layers, which generally correspond to antenna ports as described above. An RE mapper 708 maps the modulation symbols for each antenna port onto respective REs, and an OFDM signal generator 710 produces one or more complex-valued time-domain OFDM signals for eventual transmission.

It will be appreciated that the functional blocks depicted in FIG. 7 may be combined and re-arranged in a variety of equivalent ways, and that many of the functions may be performed by one or more suitably programmed digital signal processors. Moreover, connections among and information provided or exchanged by the functional blocks depicted in FIG. 7 may be altered in various ways to enable a device to implement the methods described above and other methods involved in the operation of the device in a digital communication system.

Figure 8:
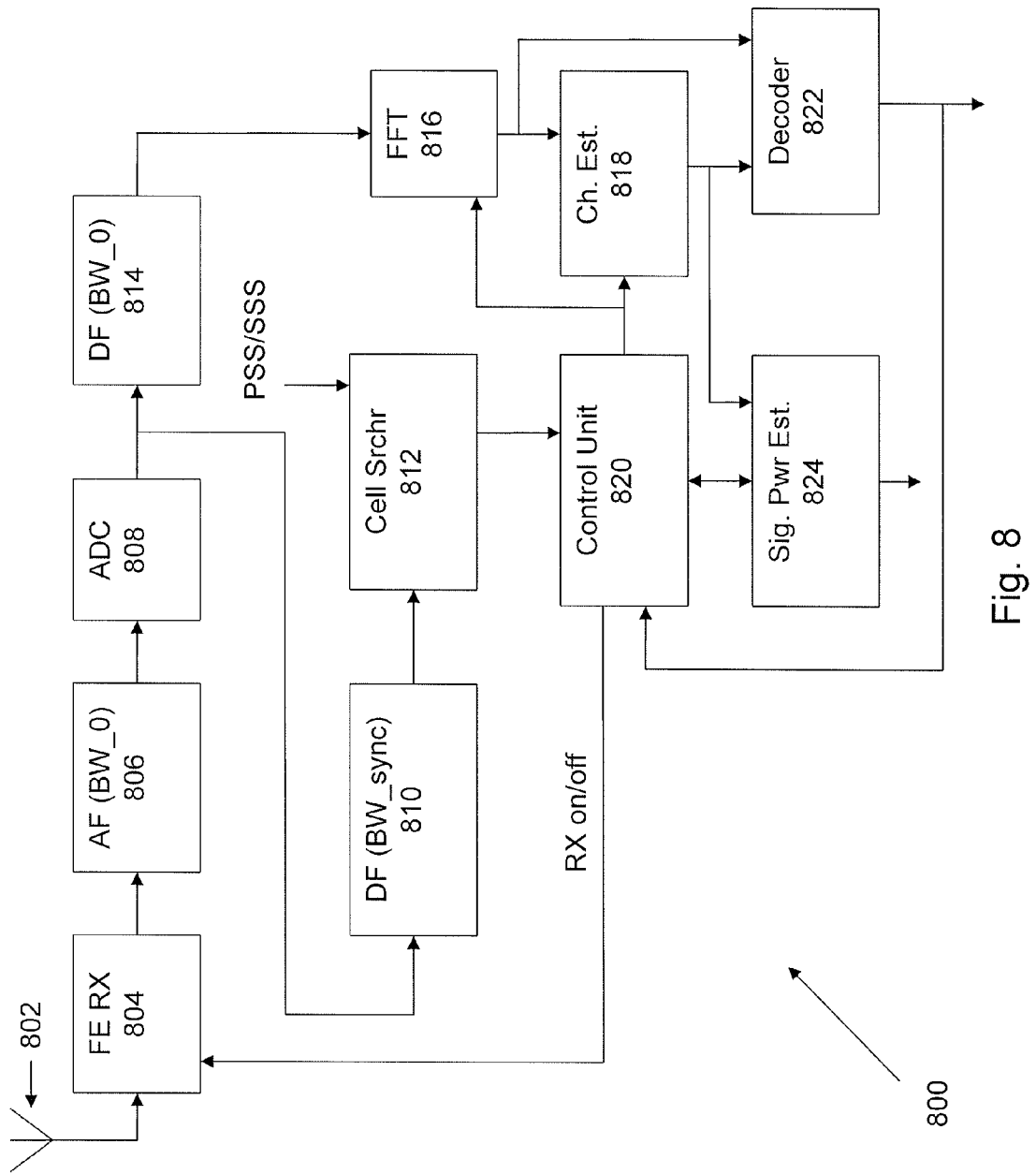
FIG. 8 is a schematic block diagram illustrating embodiments of a user equipment.

FIG. 8 is a block diagram of an arrangement 800 in a UE 103 that may implement the methods described above. It will be appreciated that the functional blocks depicted in FIG. 8 may be combined and re-arranged in a variety of equivalent ways, and that many of the functions may be performed by one or more suitably programmed digital signal processors. Moreover, connections among and information provided or exchanged by the functional blocks depicted in FIG. 8 may be altered in various ways to enable a UE 103 to implement other methods involved in the operation of the UE 103.

As depicted in FIG. 8, a UE 103 receives a DL radio signal through an antenna 802 and typically down-converts the received radio signal to an analog baseband signal in a front end receiver, i.e. Fe RX 804. The baseband signal is spectrally shaped by an analog filter 806 that has a bandwidth BW_0, and the shaped baseband signal generated by the filter 806 is converted from analog to digital form by an analog-to-digital converter (ADC) 808.

The digitized baseband signal is further spectrally shaped by a digital filter 810 that has a bandwidth BW_sync which corresponds to the bandwidth of synchronization signals or symbols included in the DL signal. The shaped signal generated by the filter 810 is provided to a cell search unit 812 that carries out one or more methods of searching for cells as specified for the particular communication system, e.g., 3G LTE. Typically, such methods involve detecting predetermined primary and/or secondary synchronization channel (P/S-SCH) signals in the received signal.

The digitized baseband signal is also provided by the ADC 808 to a digital filter 814 that has the bandwidth BW_0, and the filtered digital baseband signal is provided to a processor 816 that implements a fast Fourier transform (FFT) or other suitable algorithm that generates a frequency-domain (spectral) representation of the baseband signal. A channel estimation unit 818 receives signals from the processor 816 and generates a channel estimate H_i,j for each of several subcarriers i and cells j based on control and timing signals provided by a control unit 820, which also provides such control and timing information to the processor 816.

The estimator 818 provides the channel estimates H_i to a decoder 822 and a signal power estimation unit 824. The decoder 822, which also receives signals from the processor 816, is suitably configured to extract information from RRC or other messages as described above and typically generates signals subject to further processing in the UE 103. The estimator 824 generates received signal power measurements e.g., estimates of RSRP, received subcarrier power S_i, Signal to Interference Ratio (SIR), etc. The estimator 824 may generate estimates of RSRP, RSRQ, RSSI, received subcarrier power S_i, SIR, and other relevant measurements, in various ways in response to control signals provided by the control unit 820. Power estimates generated by the estimator 824 are typically used in further signal processing in the UE 103.

The estimator 824, or the searcher 812, for that matter, is configured to comprise a suitable signal correlator for handling the PRS and other signals described above.

In the arrangement depicted in FIG. 8, the control unit 820 keeps track of substantially everything needed to configure the searcher 812, processor 816, estimation unit 818, and estimator 824. For the estimation unit 818, this includes both method and cell identity, for reference signal extraction and cell-specific scrambling of reference signals. Communication between the searcher 812 and the control unit 820 includes cell identity and, for example, cyclic prefix configuration.

The control unit 820 determines which estimation method is used by the estimator 818 and/or by the estimator 824 for measurements on the detected cell(s) as described above. In particular, the control unit 820, which typically may include a correlator or implement a correlator function, may receive information signaled by the network and can control the on/off times of the Fe RX 804 as described above.

The control unit and other blocks of the UE 103 may be implemented by one or more suitably programmed electronic processors, collections of logic gates, etc. that processes information stored in one or more memories. The stored information can include program instructions and data that enable the control unit to implement the methods described above. It will be appreciated that the control unit typically includes timers, etc. that facilitate its operations.

It will be appreciated that the methods and devices described above can be combined and re-arranged in a variety of equivalent ways, and that the methods can be performed by one or more suitably programmed or configured digital signal processors and other known electronic circuits, e.g., discrete logic gates interconnected to perform a specialized function, or application-specific integrated circuits. Many aspects of this invention are described in terms of sequences of actions that can be performed by, for example, elements of a programmable computer system. As mentioned above, UEs 103 embodying embodiments herein comprise, for example, mobile telephones, pagers, headsets, laptop computers and other mobile terminals, and the like. Moreover, the embodiments herein may additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

It will be appreciated that procedures described above are carried out repetitively as necessary, for example, to respond to the time-varying nature of communication channels between transmitters and receivers. In addition, it will be understood that the methods and apparatus described here can be implemented in various system nodes.

To facilitate understanding, many aspects of the embodiments herein are described in terms of sequences of actions that can be performed by, for example, elements of a programmable computer system. It will be recognized that various actions could be performed by specialized circuits, e.g., discrete logic gates interconnected to perform a specialized function or application-specific integrated circuits, by program instructions executed by one or more processors, or by a combination of both. Wireless devices implementing embodiments of this invention can be included in, for example, mobile telephones, pagers, headsets, laptop computers and other mobile terminals, base stations, and the like.

Moreover, the embodiments herein may additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" may be any means that can contain, store, or transport the program for use by or in connection with the instruction-execution system, apparatus, or device. The computer-readable medium may be, for example but not limited to, an electronic, magnetic, optical, electromagnetic, infrared, or semiconductor system, apparatus, or device. More specific examples, a non-exhaustive list, of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the embodiments herein may be embodied in many different forms, not all of which are described above, and all such forms are contemplated to be within the scope of the embodiments herein. For each of the various aspects of the embodiments herein, any such form may be referred to as "logic configured to" perform a described action, or alternatively as "logic that" performs a described action.

Though many embodiments are described for LTE, the embodiments herein are not limited to E-UTRA, and not to LTE FDD or LTE TDD, but they may also apply to other RATs, e.g. UTRAN, GSM, LTE evolutions such as LTE-Advanced, LTE multi-carrier or carrier aggregation, inter-RAT multi-carrier or carrier aggregation, a.k.a. multi-RAT multi-carrier or carrier aggregation, etc.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method carried out by a positioning node for enabling a first node to perform measurements for positioning a target node using a selected carrier frequency in a communications network, the method comprising:

acquiring information about a set of carrier frequencies from the target node, the first node, a radio network node, a core network node or an operation and management, O&M, node, which information comprises information about at least a channel number and a bandwidth for each respective carrier frequency in the set, and which acquired information is comprised in information about configuration or capability of at least one of the first node and the target node;

selecting at least one carrier frequency based on the acquired information; and sending information about the selected at least one carrier frequency to the first node or the target node, which information further comprises at least a channel number and a bandwidth for the selected carrier frequency.

2. The method according to claim 1, wherein the positioning node enables the first node to perform uplink measurements for positioning the target node using the selected carrier frequency in the communications network, and wherein the target node is any of a user equipment, a relay, a beacon device, a terminal, a laptop and a small radio base station and wherein the first node is a radio network node, a radio base station or an LMU.

3. The method according to claim 1, wherein acquiring information about the set of carrier frequencies further comprises:

acquiring information related to a duplex capability of the first node and the target node; and/or acquiring information related to subframe configuration; and wherein the selecting at least one carrier frequency is further based on the information about the duplex capability and/or the information about the subframe configuration.

4. The method according to claim 1, wherein the selecting the at least one carrier frequency based on the acquired information further comprises:

selecting the at least one carrier frequency which is determined to be supported by both the first node and the target node.

5. The method according to claim 1, wherein the selecting the at least one carrier frequency based on the acquired information further comprises:

selecting the at least one carrier frequency which is determined to be used for a predetermined number of times by the first node.

6. The method according to claim 1, wherein the selecting the at least one carrier frequency based on the acquired information further comprises:

selecting the at least one carrier frequency which is determined to have a predetermined bandwidth or being within a predetermined bandwidth range.

7. The method according to claim 1, further comprising:
selecting a reference cell or a radio node based on the acquired information, which reference cell is operating on the selected carrier frequency, and which radio node is a location measurement unit, referred to as an LMU.

8. The method according to claim 1, further comprising:
selecting a subset from the set of carrier frequencies when a number of carrier frequencies in the set exceeds a number; and wherein the selecting at least one carrier frequency further comprises:

selecting at least one of at least one cell, at least one radio node or at least one carrier frequency from the set of carrier frequencies, wherein the at least one cell and the at least one radio node is associated with the selected carrier frequency.

9. The method according to claim 1, wherein the selecting the carrier frequency based on the acquired information is further based on collected measurements or measurement quality or zone information of the communications network.

10. The method according to claim 1, further comprising:
generating assistance data based on the selected carrier frequency, which assistance data assists in positioning measurements; and
wherein the sending information about the selected subset of carrier frequencies to the first node or the target node further comprises:
sending the generated assistance data to the first node or the target node.

11. The method according to claim 1, further comprising:
receiving information about a monitored set of carrier frequency layers from a measuring node, which measuring node is the target node or the first node, and wherein the selecting the at least one carrier frequency is further based on the received information about the monitored set of carrier frequency layers.

12. The method according to claim 1, wherein the acquiring information about the set of carrier frequencies further comprises sending a request to the first node, for the information about the set of carrier frequencies.

13. The method according to claim 1, wherein the acquiring information about the set of carrier frequencies further comprises receiving from the first node the requested information about the set of carrier frequencies.

14. The method according to claim 1, wherein the target node is any of a user equipment, a location measuring unit, referred to as an LMU, a relay, a beacon device, a terminal, a laptop, or a small radio base station, and wherein the first node is a user equipment, a radio network node, a radio base station or an LMU.

15. The method according to claim 1, wherein the communications system is a multi-carrier communications system or a carrier aggregation communications system.

16. A method carried out by a first node for enabling the first node to perform measurements for positioning a target node using a selected carrier frequency in a communications network, the method comprising:
sending, to a positioning node, information about a set of carrier frequencies, which information comprises at least a channel number and a bandwidth for each respective carrier frequency in the set;
receiving information about a selected at least one carrier frequency from the positioning node, which information further comprises at least a channel number and a bandwidth for the selected carrier frequency; and
performing at least one uplink or downlink measurement for positioning of the target node using the received information.

17. The method according to claim 16, wherein the sending information about the set of carrier frequencies further comprises:
sending information related to a duplex capability of the first node and the target node; and/or
sending information related to a subframe configuration; and
wherein the selected at least one carrier frequency is based on the information about the duplex capability and/or the information about the subframe configuration.

18. The method according to claim 16, wherein the selected at least one carrier frequency is at least one of:
a frequency which is determined to be supported by both the first node and the target node;
a frequency which is determined to be used for a predetermined number of times by the first node; and
a frequency which is determined to have a predetermined bandwidth or to be within a predetermined bandwidth range.

19. The method according to claim 16, further comprising:
monitoring a set of frequency layers; and
sending information about the monitored set of frequency layers to the positioning node.

20. The method according to claim 16, further comprising receiving, from the positioning node, a request for the information about the set of carrier frequencies.

21. The method according to claim 16, further comprising receiving assistance data from the positioning node, and wherein the performing the at least one measurement for positioning of the target node using the received information is further based on the received assistance data.

22. The method according to claim 16, wherein the performing the at least one measurement for positioning of the target node using the received information further comprises performing inter-frequency or inter-radio access technology measurements using the received information.

23. The method according to claim 16, wherein the information about the set of carrier frequencies comprises information about a set of monitored carrier frequency layers.

24. The method according to claim 16, wherein the measurement for positioning of the target node is required to meet a pre-determined requirement when at least a minimum number of subframes for positioning measurement are available in a period of time, wherein the pre-determined requirement comprises at least one of a measurement accuracy associated with the acquired information, a measurement time associated with the acquired information and a measurement reporting delay associated with the acquired information.

25. The method according to claim 16, wherein the sent information is comprised in information about a configuration or a capability of at least one of the first node and the target node.

26. The method according to claim 16, wherein the first node is a user equipment, a radio network node, a radio base station or a location measuring unit, referred to as an LMU.

27. A positioning node for enabling a first node to perform measurements for positioning a target node using a selected carrier frequency in a communications network, the positioning node comprising:
a receiving unit configured to acquire information about a set of carrier frequencies from the target node, the first node, a radio network node, a core network node or an operation and management, referred to as O&M, node, which information comprises information about at least a channel number and a bandwidth for each respective carrier frequency in the set, and which acquired information is comprised in information about a configuration or a capability of at least one of the first node and the target node;
a selecting unit configured to select at least one carrier frequency based on the acquired information; and
a sending unit configured to send information about the selected at least one carrier frequency to the first node or the target node, which information further comprises at least a channel number and a bandwidth for the selected at least one carrier frequency.

28. The positioning node according to claim 27, wherein the receiving unit is further configured to:
receive information related to a duplex capability of the first node and the target node; and/or to receive information related to a subframe configuration; and wherein the selecting unit is configured to select the at least one carrier frequency further based on the information about the duplex capability and/or the information about the subframe configuration.

29. The positioning node according to claim 27, wherein the selecting unit is further configured to select the at least one carrier frequency which is determined to be supported by both the first node and the target node.

30. The positioning node according to claim 27, wherein the selecting unit is further configured to select the at least one carrier frequency which is determined to be used for a predetermined number of times by the first node.

31. The positioning node according to claim 27, wherein the selecting unit is further configured to select the at least one carrier frequency which is determined to have a predetermined bandwidth or being within a predetermined bandwidth range.

32. The positioning node according to claim 27, wherein the selecting unit is further configured to, based on the acquired information, select a reference cell or a radio node, which reference cell is operating on at least the selected at least one carrier frequency, and which radio node is a location measurement unit, referred to as an LMU.

33. The positioning node according to claim 27, wherein the selecting unit is further configured to:
select a subset from the set of carrier frequencies when the number of carrier frequencies in the set exceeds a specified number; and to
select at least one of at least one cell, at least one radio node or at least one carrier frequency from the set of carrier frequencies, wherein the at least one cell and the at least one radio node are associated with the selected carrier frequency.

34. The positioning node according to claim 27, further comprising:
a generating unit configured to generate assistance data based on the selected at least one carrier frequency, which assistance data assists in positioning measurements; and wherein the sending unit is further configured to send the generated assistance data to the first node or the target node.

35. The positioning node according to claim 27, wherein the receiving unit is further configured to receive information about a monitored set of carrier frequency layers from a measuring node, which measuring node is the target node or the first node, and wherein the selecting unit is further configured to select the at least one carrier frequency further based on the received information about the monitored set of carrier frequency layers.

36. The positioning node according to claim 27, wherein the selecting unit is configured to select the at least one carrier frequency further based on a maximum number of supported carrier frequencies, bandwidth, static information, semi-static information or dynamic information, and wherein the semi-static information or dynamic information comprises at least one of cell load, received interference and radio resource usage or radio channel usage.

37. The positioning node according to claim 27, wherein the selecting unit is configured to select the at least one carrier frequency further based on collected measurements or measurement quality or zone information of the communications network.

38. The positioning node according to claim 27, wherein the communications system is a multi-carrier communications system or a carrier aggregation communications system.

39. The positioning node according to claim 27, wherein the sending unit is further configured to send, to the first node, a request for the information about the set of carrier frequencies.

40. The positioning node according to claim 27, wherein the target node is any of a user equipment, a location measuring unit, referred to as an LMU, a relay, a beacon device, a terminal, a laptop, or a small radio base station, and wherein the first node is a user equipment, a radio network node, a radio base station or an LMU.

41. A first node for performing measurements for positioning a target node using a selected carrier frequency in a communications network, the first node comprising:
a sending unit configured to send, to a positioning node, information about a set of carrier frequencies, which information comprises information about at least a channel number and a bandwidth for each respective carrier frequency in the set;
a receiving unit configured to receive information about the selected carrier frequency from the positioning node which information further comprises at least a channel number for a selected at least one carrier frequency and a bandwidth for the selected at least one carrier frequency; and
a processing unit configured to perform at least one uplink or downlink measurement for positioning of a target node using the received information.

42. The first node according to claim 41, wherein the sending unit is further configured to:
send information related to a duplex capability of the first node and the target node; and/or to
send information related to a subframe configuration; and
wherein the selected at least one carrier frequency is based on the information about the duplex capability and/or the information about the subframe configuration.

43. The first node according to claim 41, wherein the selected at least one carrier frequency is at least one of:
a frequency which is determined to be supported by both the first node and the target node;
a frequency which is determined to be used for at least a predetermined number of times by the first node; and
a frequency which is determined to have a predetermined bandwidth or being within a predetermined bandwidth range.

44. The first node according to claim 41, wherein the processing unit is further configured to monitor a set of frequency layers; and wherein the sending unit is further configured send information about the monitored set of frequency layers to the positioning node.

45. The first node according to claim 41, further comprising a receiving unit configured to receive, from the positioning node, a request for the information about the set of carrier frequencies.

46. The first node according to claim 41, wherein the sent information is comprised in information about a configuration or a capability of at least one of the first node and the target node.

47. The first node according to claim 41, wherein the processing unit is further configured to perform inter-frequency or inter-radio access technology measurements using the received information.

48. The first node according to claim 41, wherein the information about the set of carrier frequencies comprises information about a set of monitored carrier frequency layers.

49. The first node according to claim 41, wherein the measurement for positioning of the target node is required to meet a pre-determined requirement when at least a minimum number of subframes for positioning measurement are available in a period of time, wherein the pre-determined requirement comprises at least one of a measurement accuracy associated with the acquired information, a measurement time associated with the acquired information and a measurement reporting delay associated with the acquired information.

50. The first node according to claim 41, wherein the receiving unit is further configured to receive assistance data from the positioning node, and wherein the processing unit is further configured to perform at least one measurement for positioning of the target node using the received information further based on the received assistance data.

51. A method carried out by a target node for enabling a first node to perform measurements for positioning the target node using a selected carrier frequency in a communications network, the method comprising:
- sending information about a set of carrier frequencies to a positioning node, which information comprises information about at least a channel number and a bandwidth for each respective carrier frequency in the set;
- receiving information about a selected at least one carrier frequency from the positioning node, which information further comprises at least a channel number and a bandwidth for the selected at least one carrier frequency; and
- performing at least one uplink or downlink measurement for positioning of a target node using the received information.

52. A target node for enabling a first node to perform measurements for positioning the target node using a selected carrier frequency in a communications network, the target node comprising:
- a sending unit configured to send information about a set of carrier frequencies, which information comprises information about at least a channel number and a bandwidth for each respective carrier frequency in the set to a positioning node;
- a receiving unit configured to receive information about a selected at least one carrier frequency from the positioning node which information further comprises at least a channel number for the selected at least one carrier frequency and a bandwidth for the selected at least one carrier frequency; and
- a processing unit configured to perform at least one uplink or downlink measurement for positioning of a target node using the received information.

* * * * *